US012659888B2

(12) United States Patent　　(10) Patent No.:　US 12,659,888 B2

Herath　　(45) Date of Patent:　Jun. 16, 2026

(54) SYSTEMS AND METHODS FOR MULTIPLE ACCESS BASED ON CONTROLLING TRANSMIT POWER OF MULTIPLE TRANSMIT ANTENNAS

(71) Applicant: Samsung Electronics Company, Ltd., Suwon-si (KR)

(72) Inventor: Sanjeewa Herath, Stittsville (CA)

(73) Assignee: Samsung Electronics Company, Ltd., Suwon City (KR)

( * ) Notice: Subject to any disclaimer, the term of this patent is extended or adjusted under 35 U.S.C. 154(b) by 292 days.

(21) Appl. No.: 18/488,418

(22) Filed: Oct. 17, 2023

(65) Prior Publication Data

US 2025/0126578 A1　Apr. 17, 2025

(51) Int. Cl.
| | |
|---|---|
| *H04W 52/14* | (2009.01) |
| *H04B 7/04* | (2017.01) |
| *H04W 52/08* | (2009.01) |
| *H04W 52/24* | (2009.01) |
| *H04W 52/26* | (2009.01) |
| *H04W 52/42* | (2009.01) |

(52) U.S. Cl.
CPC .................................. *H04W 52/42* (2013.01)

(58) Field of Classification Search
None
See application file for complete search history.

(56) References Cited

U.S. PATENT DOCUMENTS 9,363,769 B2 * 6/2016 Luo ..................... H04W 52/281
9,634,879 B2 * 4/2017 Miyazaki ............ H04L 27/3416

12,192,910 B2 * 1/2025 Kang ................... H04W 52/367
12,342,293 B2 * 6/2025 Okamura .............. H04W 52/42
2012/0020286 A1 * 1/2012 Damnjanovic ..... H04W 52/281
370/328

(Continued)

FOREIGN PATENT DOCUMENTS

EP　　3515134 A1　7/2019
KR　20180055868 A　5/2018

OTHER PUBLICATIONS

Budhiraja et al., "A Systematic Review on NOMA Variants for 5G and Beyond," in IEEE Access, vol. 9, pp. 85573-85644, 2021, doi: 10.1109/ACCESS.2021.3081601.

(Continued)

*Primary Examiner* — Pablo N Tran

(74) *Attorney, Agent, or Firm* — Baker Botts L.L.P.

(57)　　　　ABSTRACT

In one embodiment, a method includes accessing a sequence of symbols, generating a signal from the symbols by mapping a first symbol to a first antenna and a second antenna, determining a first transmit power for the first symbol in the first antenna based on a first power scaling coefficient and a second transmit power for the first symbol in the second antenna based on a second power scaling coefficient, mapping a second symbol to the first antenna and the second antenna, determining a third transmit power for the second symbol in the first antenna based on a third power scaling coefficient and a fourth transmit power for the second symbol in the second antenna based on a fourth power scaling coefficient, wherein the first, second, third, and fourth transmit power is different from each other, and transmitting the generated signal by the first antenna and the second antenna.

13 Claims, 16 Drawing Sheets

(56) References Cited

U.S. PATENT DOCUMENTS

| 2019/0327686 A1 | 10/2019 | Zhang |
| 2023/0142271 A1 | 5/2023 | Huang |
| 2024/0214145 A1* | 6/2024 | Yuan ........................ H04L 5/00 |

OTHER PUBLICATIONS

"6G: The Next Horizon White Paper," Future Technologies, HuaweiTech, 4 pages. Available at https://www.huawei.com/en/huaweitech/future-technologies/6g-white-paper [access on Jun. 12, 2023].

Tse, et al., "Fundamentals of wireless communication," Cambridge university press, 2005, 64 pages.

"Study on Non-Orthogonal Multiple Access (NOMA) for NR (Release 16)," 3GPP, TR 38.812 V16.0.0 (2018-12), 134 pages. https://panel.castle.cloud/view_spec/38812-g00/pdf/.

Liu, et al., "Evolution of NOMA Toward Next Generation Multiple Access (NGMA) for 6G," in IEEE Journal on Selected Areas in Communications, vol. 40, No. 4, pp. 1037-1071, Apr. 2022.

Kaltenberger, et al., "Correlation and capacity of measured multi-user MIMO channels," IEEE 19th International Symposium on Personal, Indoor and Mobile Radio Communications, Cannes, France, 2008, Doi: 10.1109/PIMRC.2008.4699493, pp. 1-5.

Loghin, et al., "Non-Uniform Constellations for ATSC 3.0," in IEEE Transactions on Broadcasting, vol. 62, No. 1, pp. 197-203, Mar. 2016, doi:10.1109/TBC.2016.2518620.

"Physical channels and modulation" (Release 17), 3GPP, TS 38.211, V17.4.0 (Jan. 2023), https://www.etsi.org/deliver/etsi_ts/138200_138299/138211/17.04.00_60/ts_138211v1704 00p.pdf, 141 pages.

"Physical layer procedures for control" (Release 17), 3GPP, TS 38.213, V17.5.0 (May 2022), 247 pages. https://www.etsi.org/deliver/etsi_ts/138200_138299/138213/17.01.00_60/ts_138213v170100p.pdf.

Dahlman, et al., "5G NR: The next generation wireless access technology," Chapter 15, Academic Press, 2021, ISBN 978-0-12-822320-8, 12 pages, retrieved on Feb. 8, 2024.

International search report and Written Opinion received for PCT Application No. PCT/KR2023/020875, mailed Jul. 10, 2024, 7 pages.

Yan et al., 'Performance, Power, and Area Design Trade-offs in Millimeter-Wave Transmitter Beamforming Architectures', ResearchGate, pp. 1-19, Jul. 31, 2018. Retrieved from <URL: https://www.researchgate.net/ publication/326505762 Performance_Power_and_Area_Design_Trade-offs_in_Millimeter-Wave_Transmitter_Beamforming_Architectures>.

* cited by examiner

Base Station 230

$h_1$ $h_2$

User Equipment 210

User Equipment 220

$$\overline{c}_i = 1-c_i \ , \ i=1,2$$

Hopping In Time Domain

Hopping In Frequency Domain

SYSTEMS AND METHODS FOR MULTIPLE ACCESS BASED ON CONTROLLING TRANSMIT POWER OF MULTIPLE TRANSMIT ANTENNAS

TECHNICAL FIELD

This disclosure relates generally to wireless communications, and in particular relates to systems and methods for enabling massive wireless communications with limited resources.

BACKGROUND

With the exponential growth of cellular system use, future cellular system such as beyond 5G cellular systems or 6G cellular systems are expected to generate a huge amount of data traffic from an extremely large number of devices. It is predicted that by 2023 there would be 14.7 billion devices connect to the Internet of Things (IoT). From compound annual growth report forecasts, more than 78 billion connected devices may utilize the cellular network services by the end of the year 2023. 6G cellular systems are expected to support a tenfold increase in the density of 5G connections and the connection density of these future cellar systems is expected to reach 10 million devices per 1 $km^2$. Such a large density of 6G cellular systems may connect everything and may become the continuous evolution of massive machine type of communication (mMTC) usage scenario in 5G. Such a large connection density can be characterized by the massive number of lightly connected machine and IoT type of devices with sporadic traffic rooted in the applications scenarios such as smart home, smart cities, healthcare, buildings, transportation, manufacturing, and agriculture.

DESCRIPTION OF EXAMPLE EMBODIMENTS

Figure 1:
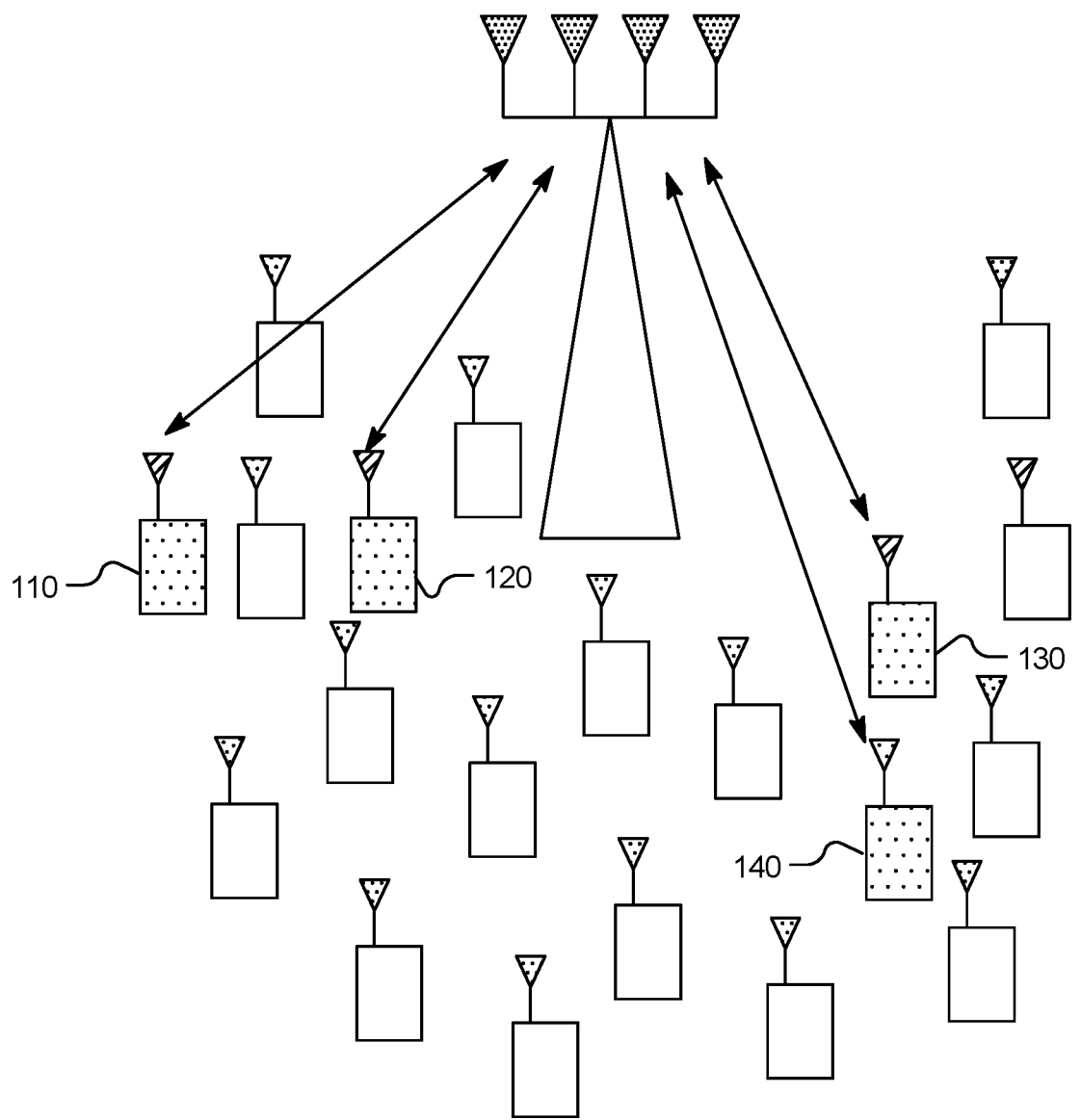
FIG. 1 illustrates an example grant-free scenario where only a portion of devices is active out of a large pool of potential/prospective devices.

Multiple Access Based on Controlling Transmit Power of Multiple Transmit Antennas In particular embodiments, a cellular system may control the transmit power of multi-antenna transmitters to create power-level disparity between multiple signals (corresponding to multiple transmitters) in received composite signal at a receiver. The cellar system may adjust the symbol amplitudes within the transmit processing chain or based on modified power control mechanisms. As the values for symbol amplitude adjustments or the ways of power control are prior known at the transmitter through signaling, the embodiments disclosed herein may be based on an open-loop transmission scheme and may be implemented without the instantaneous channel knowledge (i.e., channel state information (CSI)) at the transmitter. In particular embodiments, the power level of the received signal corresponding to a particular transmitter may be different from the power level of the received signal corresponding to another transmitter, which may be achieved by transmitting at prior known power levels from multiple antennas. The decoder and successive interference cancellation (SIC) operation may then utilize this power-level disparity between different transmitters to decode the signals from different transmitters more efficiently and effectively. Because the power-level disparity based on multiple antennas is created by controlling the power levels or based on symbol amplitude modifications, even if the pathloss or propagation channels are similar, the receiver may be able to detect and decode the signals from multiple transmitters. Based on the level of channel similarity or channel parameter correlation, the power-level disparity may be adjusted accordingly. As an example and not by way of limitation, when the channel is very similar, the power-level disparity created by multiple antennas may help improve the performance significantly. Although this disclosure describes creating particular power-level disparity by particular systems in a particular manner, this disclosure contemplates creating any suitable power-level disparity by any suitable system in any suitable manner.

In particular embodiments, a first wireless endpoint device comprising a plurality of antennas may access a sequence of symbols. The first wireless endpoint device may then generate a signal from the sequence of symbols for transmission. In particular embodiments, the generation may comprise the following steps. The first wireless endpoint device may map a first symbol of the sequence of symbols to at least a first antenna and a second antenna of the plurality of antennas. The first wireless endpoint device may then determine, based on a first power scaling coefficient, a first transmit power associated with the first symbol in the first antenna. The first wireless endpoint device may then determine, based on a second power scaling coefficient, a second transmit power associated with the first symbol in the second antenna. The first transmit power may be different from the second transmit power. The first wireless endpoint device may then map a second symbol of the sequence of symbols to at least the first antenna and the second antenna. The first wireless endpoint device may then determine, based on a third power scaling coefficient, a third transmit power associated with the second symbol in the first antenna. The first wireless endpoint device may further determine, based on a fourth power scaling coefficient, a fourth transmit power associated with the second symbol in the second antenna. The third transmit power may be different from the fourth transmit power, the first transmit power may be different from the third transmit power, and the second transmit power may be different from the fourth transmit power. The first transmit power may or may not be different from fourth transmit power and the second transmit power may or may not be different from third transmit power. In particular embodiments, the first wireless endpoint device may further transmit, by the plurality of antennas comprising at least the first antenna and the second antenna, the generated signal from the first wireless endpoint device.

In particular embodiments, a first wireless endpoint device with or without plurality of antennas may detect/aware a plurality of second wireless endpoint devices requesting communication resources associated with the first wireless endpoint device. Each of the plurality of second wireless endpoint devices may comprise a plurality of antennas. The first wireless endpoint device may then transmit, to each of the plurality of second wireless endpoint devices, a respective controlling parameter configured for adjusting a transmit power of each of the plurality of antennas associated with the corresponding second wireless endpoint device. The first wireless endpoint device may then receive a composite signal at the first wireless endpoint device. In particular embodiments, the composite signal may comprise a superposition of a plurality of signals transmitted from the plurality of second wireless endpoint devices, respectively. Each of the plurality of signals may be transmitted by the plurality of antennas associated with the corresponding second wireless endpoint device based on the corresponding adjusted transmit powers associated with the plurality of antennas. The first wireless endpoint device may further decode the composite signal to individually identify each of the plurality of signals.

In particular embodiments, a first wireless endpoint device with or without plurality of antennas may detect/aware a plurality of second wireless endpoint devices having data to be received and hence communication resources to be allocated by the first wireless endpoint device. Each of the plurality of second wireless endpoint devices may comprise a plurality of antennas. The first wireless endpoint device may then transmit, to each of the plurality of second wireless endpoint devices, a respective controlling parameter configured for adjusting a transmit power of each of the plurality of antennas associated with the corresponding second wireless endpoint device. The first wireless endpoint device may then send a composite signal from the first wireless endpoint device. In particular embodiments, the composite signal may comprise a superposition of signals to be received at second wireless endpoint devices. The superposition of the plurality of signals may be transmitted by the plurality of antennas associated with the corresponding first wireless endpoint device based on the corresponding adjusted transmit powers associated with the plurality of antennas. The second wireless endpoint devices may further decode the composite signal to individually identify each of the plurality of signals or the corresponding signal for that second device.

In particular embodiments, a first wireless endpoint device with or without plurality of antennas may detect/aware a plurality of second wireless endpoint devices requesting communication resources associated with a third wireless endpoint device. In another particular embodiment, the first wireless endpoint device with or without plurality of antennas may detect/aware the plurality of second wireless endpoint devices having data to be transmitted to a third wireless endpoint device and requesting communication resources to be allocated for communication with one or more third wireless endpoint device(s). Each of the plurality of second wireless endpoint devices and third wireless endpoint devices may comprise a plurality of antennas. The first wireless endpoint device may then transmit, to each of the plurality of second and third wireless endpoint devices, a respective controlling parameter configured for adjusting a transmit power of each of the plurality of antennas associated with the corresponding second wireless endpoint device. The third wireless endpoint device may then receive a composite signal at the third wireless endpoint device. In particular embodiments, the composite signal may comprise a superposition of a plurality of signals transmitted from the plurality of second wireless endpoint devices, respectively. Each of the plurality of signals may be transmitted by the plurality of antennas associated with the corresponding second wireless endpoint device based on the corresponding adjusted transmit powers associated with the plurality of antennas. The third wireless endpoint device may further decode the composite signal to individually identify each of the plurality of signals.

Certain technical challenges exist for enabling multiple access based on controlling transmit power of multiple transmit antennas. One technical challenge may include creating a power domain signature. The solution presented by the embodiments disclosed herein to address this challenge may be adjusting transmit power at each antenna based on a distinct power scaling coefficient as these distinct power scaling coefficients may help achieve power level difference at the receiver side. Another technical challenge may include determining the power scaling coefficients/factors. The solution presented by the embodiments disclosed herein to address this challenge may be computing the power scaling coefficients based on various channel similarity information as such information may help determine how to adjust the power scaling coefficients to achieve the effective channel for each device. Another technical challenge may include maintaining the average error rate for all the devices compared to equal power transmission from individual antenna. The solution presented by the embodiments disclosed herein to address this challenge may be adjusting the power levels of antennas within a transmission over multiple symbols for a given device as such approach may effectively utilize the diversity of the multiple antennas of the same device and the multi-device diversity of the system. In an alternative implementation, the power of transmitted symbols from each antenna may be controlled/adjusted/modified by the amplitude of the symbol/signal.

Certain embodiments disclosed herein may provide one or more technical advantages. A technical advantage of the embodiments may include supporting massive connectivity and achieving high spectral efficiency as the embodiments may use the non-orthogonal multiple access technology which may be objectives of the future cellular systems. Another technical advantage of the embodiments may include applicability in low frequency range or moderate/high frequency range as multiple antennas can be used in any operating frequency. Another technical advantage of the embodiments may include avoiding using non-standard/special modulation (e.g., multi-dimensional modulation) as the embodiments use one of the simplest forms of multiple access signature generation, i.e., power domain non-orthogonal multiple access signature. Another technical advantage of the embodiments may include flexibility in implementations and adoptions to standards as the embodiments can be implemented in multiple ways such as power domain non-orthogonal multiple access, power control, spreading sequence etc. and on top of existing state-of-the-art non-orthogonal multiple access schemes such as SCMA, MUSA, IGMA, RSMA, LCRS, etc. Certain embodiments disclosed herein may provide none, some, or all of the above technical advantages. One or more other technical advantages may be readily apparent to one skilled in the art in view of the figures, descriptions, and claims of the present disclosure.

In order to support massive number of connections, efficient multiple access schemes where given physical resources such as time-frequency being used by the devices may be required. Orthogonal multiple access (OMA) schemes share the available physical resources in an orthogonal manner (i.e., non-overlapping physical resources). Examples of OMA may include frequency division multiple access (FDMA) and time-division multiple access (TDMA).

OMA may avoid two devices simultaneously using the same physical resources (i.e., overlapping transmissions) and therefore, eliminate the interference caused by each other's transmissions. While OMA simplifies the transceiver design, for given physical resources, only a limited number of devices may be scheduled (because every device may require separate physical resources). As such, in order to support large device density of future cellular systems, a significantly amount of resources may be required. Furthermore, mMTC devices may access network by grant-free transmission mechanism in which only a portion of the devices are transmitting simultaneously out of many potential devices. As a result, with a varying number of devices demanding cellar services, OMA schemes may be not scalable with increasing and varying device density and traffic conditions. Furthermore, OMA may require careful scheduling of different device transmissions to orthogonal resources, which may incur large signaling overheads (e.g., in configured grant or scheduled transmission or grant-based scenarios). In order to maintain orthogonality between transmissions, careful device scheduling along with strong feedback channels with accurate channel state information (CSI) may be required. Additionally, OMA may cause large delays, thereby not meeting the delay requirements of certain applications. It is also known that the OMA may not achieve the capacity of multi-device transmission.

Compared to OMA, non-orthogonal multiple access (NOMA) may be a better technique for supporting a massive number of devices. The NOMA schemes may allow multiple devices to access the same physical resources simultaneously (i.e., share the same physical resources by multiple devices). Therefore, NOMA may have a lower signaling overhead for resource allocation or device scheduling and the transceiver may be optimized to cater for dynamic traffic conditions. As opposed to OMA, NOMA may achieve better spectral efficiency or capacity by allowing simultaneous access to the available physical resources among multiple devices. Additionally, the non-orthogonal behavior of NOMA may decrease the scheduling overheads and the requirement for precise CSI.

When two or more devices transmit over the same physical resources, the signals from different transmissions may be superposed. In uplink transmissions, multiple devices may transmit to a base station and signals may be superposed in the air. In downlink transmissions, a base station may transmit superposed signal intended for multiple devices. In side link transmissions, a device may transmit to another device. As such, the receiver may observe a superposition of multiple signals. These multiple signals may interfere with each other. As an example and not by way of limitation, in uplink transmissions, a transmission from one device may interfere with a transmission from another device. In order to separate individual transmissions (i.e., detection and decoding of signals), usually a successive interference cancellation (SIC) based receiver may be used.

The received composite signal (which may be a superposition of multiple signals) may be passed to the detector. The detector may perform multi-device detection, which separates the individual device signals and/or compute intermediate variables such as log-likelihood ratios (LLRs) for each transmission from the received composite signal. These individual device signals and/or computed intermediate variables may be then passed to the decoder as inputs. The algorithms for the detector may comprise one or more of minimum mean squared error (MMSE), matched filter (MF), elementary signal estimator (ESE), maximum a-posterior (MAP), message passing algorithm (MPA), expectation propagation algorithm (EPA), a combination thereof, or another option/variation. The decoder such as LDPC decoder or Polar decoder may estimate the data (i.e., information bits of individual transmissions). The decoder may also perform intermediate signal processing for interference cancellation and pass the processed signal back to the detector for removing the interference from the received composite signal. This step may be usually performed to improve the quality of individual device signals and/or intermediate variables such as LLRs for the next round of decoding. The decoding may be hard or soft and may be implemented in a serial or parallel manner. The hard interference cancellation may be based on the hard output of the decoder. In the soft interference cancellation, the decoder may output soft information, which may be used to reconstruct symbols removed from the received composite signal. In serial processing, transmissions may be decoded one by one (i.e., a sequential manner). In parallel processing, transmissions may be decoded simultaneously. Variations of soft decoding, hard decoding, serial processing, and parallel processing may exist. In the serial cancellation receiver, each successfully decoded transmission may have its signal cancelled and removed from the composite signal and the pool of transmissions to decode, before processing the subsequent transmissions. In the parallel interference cancellation receiver, all transmissions may be decoded in parallel and successfully decoded transmissions may have their signals cancelled and removed from the composite signal and the pool of transmissions to decode. Processing signals by passing signal or intermediate variables between the detector and the decoder via interference cancellation may be referred as (outer) iterations. As such the SIC receiver may be an iterative receiver. In addition to the (outer) iterations, the detector, decoder, or both may also perform iterative processing inside, which may be referred to as (inner) iterations.

One feature of current and future cellular system may include the use of multiple antennas at a transmitter, a receiver, or both. While multiple antennas have been used in any operating frequency, e.g., low frequencies such as FR1 in NR and medium-to-high frequencies such FR2 in NR and moderate-to-high frequency region such as mmWave/THz region, multiple antennas may be considered an essential technology. This may be partly because the path loss is directly proportional to the operating carrier frequency and therefore, at moderate and higher frequency regions, the small receive power may lead to poor spectral efficiency, high block error rates, low link reliability, and low coverage. By using multiple antennas at these frequencies, the high pathloss may be compensated by beamforming (i.e., array gain). For the general Gaussian multiple input single output (MISO) or multiple input multiple output (MIMO) multiple access channel (MAC) (i.e., uplink), the capacity region may be achieved by employing NOMA with a SIC receiver. Therefore, MIMO NOMA may be capacity-achieving. When the transmitter, receiver, or both use multiple antennas, spatial separation of the composite signal (with or without SIC receiver) may be a viable option. Therefore, the use of NOMA technology along with multi-antenna system may be a promising approach for supporting high device density.

In future cellular system where massive connection density with high spectral efficiency (e.g., 10 million devices per 1 $km^2$) is expected, many devices may be in very close proximity to each other. Such a massive number of connections may come from smart home appliances, wearables, IoT devices, robots, smart factory environment (e.g., machines, robot arms, sensors), smart farms, hospitals, airports, and ports with many devices connecting to the network. Therefore, the propagation channel from multiple devices may be similar. For example, pathloss from another close-proximity device (e.g., sensors in a robot arm, robot arms in a product line, multiple smart homes devices in a single room, multiple wearables of a person, baggage in an airport, animals' tags in a farm, etc.) may be very close to each other. In another situation, one or more channel modeling parameters from different devices/sensors may also be very similar. For example, the propagation channel characteristics may be parameterized by channel parameters such as average gain, average delay, delay spread, Doppler spread, Doppler shift, angle of arrival, angle of departure and other spatial parameters. When one or more of these channel parameters are similar, those channels may be considered similar. These channel parameters may be modeled as random variables as the wireless propagation varies by many factors. Channel similarity may be quantified by the parameter correlation level. The correlation or dependence may be any statistical relationship between two random variables, which may usually refer to the degree to which a pair of variables are linearly related. In one example, similar pathloss may mean almost similar power at the receiver. When the channel is similar, one or more channel propagation parameters may be correlated. As the propagation channel similarity is primarily caused by the close proximity of devices/sensors, the propagation channels may be similar no matter whether multiple antennas are used at the transmitter, receiver, or both.

When the channels from different devices/sensors are similar or correlated, the detection/decoding of multiple transmissions (from different devices/sensors) may fail even if a SIC receiver is used. This may be because the detector/decoder and SIC operations may heavily utilize the channel dissimilarity. In other words, when one or more properties of the propagation channels to/from multiple devices are similar or correlated, which may be a common scenario in a system with high connection density, the detection/decoding of the transmissions from these devices may fail. Such detection/decoding failures may lead to poor overall spectral efficiency, high block error rates, low link reliability, and low coverage. Hence, the efficiency of multiple access may be severely impaired. When there are a large number of devices accessing the physical resources simultaneously, at least a few devices may have similar channel conditions. As a result, the detection/decoding of those transmissions may dominate the overall performance of the multiple access. As described earlier, the channel similarity may not be avoided even if multiple antennas are used at transmitter or receiver sides. Therefore, the performance deterioration of the multiple access may not be resolved by merely using multiple antennas. This may be because receivers handling multiple multi-antenna devices may not work well when the pathloss are similar and/or one or more channel parameters are correlated. In summary, the similarity of propagation channel (i.e., similar pathloss and/or channel parameter correlation) may be a common scenario, which may ascend from the close proximity and/or high density of devices in the current and future cellular systems. Therefore, multiple access performance may be severely deteriorated despite using the state-of-the-art technologies such as NOMA technology with advanced receivers such as SIC receiver and/or MIMO technology. Moreover, the multiple access schemes for future cellular systems such as beyond 5G NR. 5G advanced, or 6G may be efficient irrespective of whether the propagation channels are dissimilar for all devices. Furthermore, the multiple access scheme may be scalable for varying device densities, adaptable in grant-free, grant-based, configured grant or scheduled transmission scenarios. The multiple access technology may be unified across low-to-high carrier/operating frequencies with good performance benefits. Additionally, the multiple access technology may be adaptable to uplink, downlink and side link scenarios as these devices may access, transmit, or receive data in all these scenarios. In order to handle a large number of connection densities, more often devices/sensors may transmit/receive data in different radio-resource-control (RRC) states such as RRC inactive, idle, connected or other RRC states. Therefore, a simple but efficient multiple access technology should cater for different RRC states as well. As such, the requirements for multiple access technology may be stringent and such technology should be carefully designed to harness the advantages of the state-of-the-art NOMA and MIMO technologies.

In particular embodiments, the multiple access scheme disclosed herein may support massive number of connections or connection densities. The multiple access scheme disclosed herein may be suitable for any operating frequency (low, medium, or high) and for any of uplink, side link or downlink scenarios. In particular embodiments, the cellular system may utilize the NOMA and MIMO technologies to improve the efficiency and performance of the multiple access. When there are a large number of devices transmitting simultaneously in the same physical resources, it may be likely that at least a few devices have similar channel conditions (e.g., due to close proximity of the transmitters) and these poorly conditioned channels may dominate the overall multiple access performance. The multiple access scheme disclosed herein may achieve good performance regardless of whether the channels of all devices are dissimilar/different/uncorrelated/independent from one another. Although this disclosure contemplates solving the issue of performance deterioration of the multiple access or improving the system performance when the propagations channels to/from multiple devices are similar (or correlated), this disclosure contemplates also working well even if the channels to/from multiple devices are dissimilar.

The multiple access scheme disclosed herein may be implemented on the cellular systems (e.g., mobile terminal side or network side) in order to improve the system performance for massive connection scenarios or mMTC use cases. Without implementing the multiple access scheme disclosed herein, the performance of the multiple access may be degraded. The expected performance gains have been validated and verified through computer simulations (provided in this disclosure). Furthermore, multiple ways to implement the multiple access scheme disclosed herein using the state-of-the-art signal processing techniques are also provided. Therefore, the multiple access scheme disclosed herein may easily be adopted and promoted in cellular standard organizations such as 3GPP, Wi-Fi and others.

As discussed above, the number of devices accessing cellular systems and device density are ever growing. When there are many devices in a cellular coverage area and only a small fraction of these devices is actively transmitting/receiving (i.e., grant-free transmission scenario), the resources should be allocated to those active devices. When a large number of devices access the physical resources, multiple access technology may take the following issues to consideration. One issue may be that due to the exponential growth of the number of devices, accessing the resources in an orthogonal manner (i.e., OMA) may run out of the resources quickly despite having a large frequency band (i.e., resources), especially in high frequency operation. Furthermore, OMA may lead to inefficient resource utilization or low spectral efficiency as OMA is suboptimal as compared to the NOMA. Another issue may be that in the grant-free scenario, there may be many potential devices in the system but only a small portion of them have data to transmit/receive, i.e., only a small fraction of the devices is actively transmitting/receiving at a given instant of time. Furthermore, those data transmissions may be sporadic and small. In order to schedule the best physical resources for a device (e.g., utilizing multi-device diversity also commonly referred as multi-user diversity in literature), the propagation channel measurements (i.e., channel state information) should be available to the scheduler, which may incur large overheads for reference signal (for CSI measurements) transmission, CSI computation and reporting/feedback. As such, signaling overhead for scheduling the resources for the active devices may be large.

In order to overcome these issues, the NOMA technology may be used. In a grant-free transmission scenario where a fraction of devices is active, those active devices may simultaneously access the same physical resources (i.e., share the same physical resources). FIG. 1 illustrates an example grant-free scenario where only a portion of devices is active out of a large pool of potential/prospective devices. In other words, out of a large number of potentially active devices, at a given instance, only a portion of devices are actively transmitting while in another instance another portion of devices are actively transmitting and the physical resources (time/frequency) for those actively transmitting devices are not explicitly scheduled/configured from the network side as in scheduled transmission or configured grant transmission. For instance, device 110, device 120, device 130, and device 140 are active while all the other devices are inactive. Therefore, explicitly scheduling the resources may be not required or possible (as the randomly active devices are not explicitly reported to the network side prior to transmission or not feasible due to time sensitivity or other reason), which may significantly reduce the signaling overheads and measurements or computation complexities. As such, in order to handle the large number of device densities and to achieve spectral efficiency, the use of NOMA technology is promising.

Multiple antennas may be installed at a transmitter, a receiver, or both. For example, cellular systems such as 5G NR may use multi-antenna technologies for using spatial degree of freedom for improving data rate/spectral efficiency (e.g., spatial multiplexing, array gain, and beamforming), and link reliability (e.g., using diversity, array gain, and beamforming) both in low frequencies (e.g., FR1) and moderate-to-high frequencies (e.g., FR2). Space division multiple access or multi-device (or multi-user) MIMO (MU-MIMO) is known technology to separate multiple devices using multiple antennas. As such, a cellular system may also utilize those benefits of multi-antenna systems. Multi-device (or multi-user) MIMO technology may rely on channel dissimilarity/difference/independence between different transmitters for separating the signals from different transmitters (i.e., detection/decoding). However, when the channel is similar, MU-MIMO may fail, leading to poor overall system performance. When a fraction of devices out of a large number of devices is active, there may be a high probability that multiple active devices may experience similar channel propagation condition. As this disclosure will show in the validation with simulation results, when two or more transmissions experience similar channel conditions, those transmissions may interfere with each other and MU-MIMO techniques may not separate (i.e., detecting or decoding) individual transmissions. It means that even if multiple antennas are used, detection/decoding may fail when two or more devices experience similar channel conditions. As discussed above, the channel similarity may be measured by correlation between one or more channel modeling parameters. As an example, when two propagation channels have similar pathloss, these channels may be considered similar. Yet in another example, when two propagation channels have highly correlated power delay profiles, these two channels may be considered similar.

Figure 2:
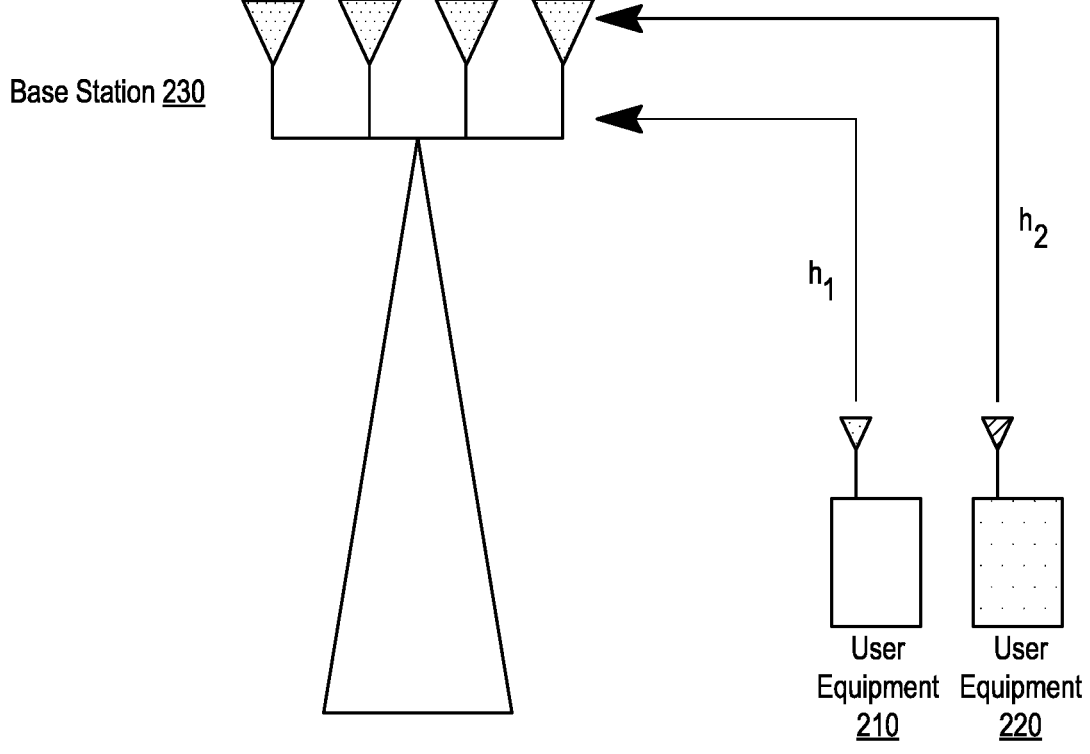
FIG. 2 illustrates an example uplink transmission of two user equipment (UE).

FIG. 2 illustrates an example uplink transmission of two user equipment (UE). The two user equipment (i.e., UE 210 and UE 220) may have similar channel conditions due to close proximity of these devices. Propagation channels from UE 210 and UE 220 to the base station 230 are denoted as $h_1$ and $h_2$, respectively. Power domain separation (power domain NOMA) and code domain separation (code domain NOMA) are described as below.

When the receive power levels from different user equipment are dissimilar, the detection/decoding with SIC operation, i.e., SIC receiver, may separate the individual transmissions that are originated from both devices despite these transmissions causing interference to each other. On the other hand, if the power levels of received signals from different devices are almost similar (i.e., similar pathloss), the signals may be difficult to separate.

Figure 3:
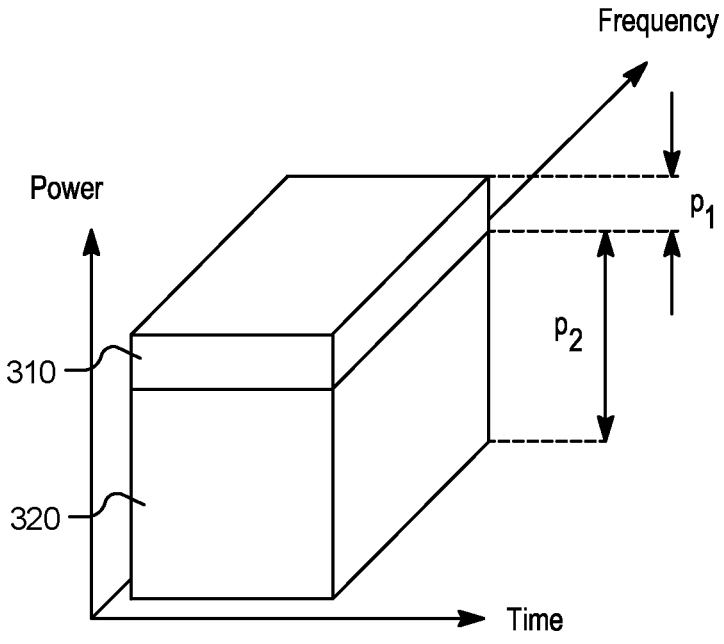
FIG. 3 illustrates an example power domain NOMA.

FIG. 3 illustrates an example power domain NOMA. The power of transmission 310 is reduced compared to the power of transmission 320. If the power of one transmission is reduced compared to the other transmission in order to create a power-level difference among the received signals, the lower power transmission may suffer from a rate loss or an outage. This may be because, in order to achieve certain link performance, the power of a received signal may need to be above a certain threshold value. As such, the technique of creating intentional power-level difference by controlling the transmit power of one user equipment (UE)/device may not achieve good overall link performance for all the user equipment (UE) because one or more user equipment may sacrifice link performance by reducing the transmission power levels. As a result, a technical advantage of the embodiments may include supporting massive connectivity and achieving high spectral efficiency as the embodiments may use the non-orthogonal multiple access technology which may be objectives of the future cellular systems.

In general, multiple access (MA) signature may be embedded into the transmitted signal in code domain NOMA. The properties of the signature may be utilized by the SIC receiver for decoding. The MA signature may be in bit domain, symbol domain, or both. For example, one or more of bit-level operations such as bit interleaving, bit scrambling, or bit repetition may be considered as an MA signature, associated with an MA signature, or part of an MA signature. As another example, one or more of symbol-level operations such as linear spreading, non-linear spreading, multi-dimensional modulation, sparse spreading, sparse mapping, symbol interleaving, symbol scrambling, or symbol puncturing may be considered as an MA signature, associated with an MA signature, or part of an MA signature. As another example, one or more of symbol-level or bit-level operations may be considered as an MA signature, associated with an MA signature, or part of an MA signature. Bit interleaving may mean bit permutation or location change. Bit scrambling may mean bit XOR operation with a known bit sequence. Bit repetition may mean repeating a fixed/known number of times. Linear spreading may mean reproducing a symbol based on a known sequence (referred as linear spreading sequence). As an example, for linear spreading, the symbol s spread by the spreading sequence [1,1] is [s,s] and the symbol s spread by the spreading sequence [1,−1] is [s,−s]. Symbol scrambling may mean multiplying the symbol sequence with a known sequence (commonly referred as scrambling sequence). As an example, for scrambling, the symbols $[s_1,s_2]$ scrambled by the scrambling sequence [1,1] is $[s_1,s_2]$ and the symbols $[s_1,s_2]$ scrambled by the scrambling sequence [1,−1] is $[s_1,−s_2]$. Sparse spreading or sparse mapping may mean reproducing a symbol based on a known sequence where the known sequence has zero power symbol. As an example, for sparse spreading, the symbol s spread by the sparse spreading sequence [1,0] is [s,0] and the symbol s spread by the sparse spreading sequence [0,1] is [0,s]. The non-linear spreading or multi-dimensional modulation may mean mapping bits to symbols directly where the spreaded symbol relationship is determined by the input bit sequence (as compared to the fixed sequence in linear spreading). A combination of MA signature may be considered as a NOMA scheme. For example, bit scrambling with linear spreading may form an MA signature and may be referred as a NOMA scheme. In another example, bit interleaving with sparse spreading may form an MA signature and may be referred as another NOMA scheme. In another example, bit scrambling with non-linear spreading may form an MA signature and may be referred as another NOMA scheme. In another example, bit scrambling may form an MA signature and may be referred as another NOMA scheme. These techniques of embedding or generating a transmit signal (commonly referred as NOMA signal) using an MA signature may be considered code domain separation. When the power levels of received signals are similar or the channels are similar, orthogonal or near orthogonal codes for each user may be needed in order to fully separate the transmission. As a result, orthogonal code or OMA may be performed. As detailed earlier, OMA is low-spectrally efficient and in general suboptimal. The embodiments disclosed herein may have a technical advantage of avoiding using non-standard/special modulation (e.g., multi-dimensional modulation) as the embodiments use one of the simplest forms of multiple access signature generation, i.e., power domain non-orthogonal multiple access signature.

In order to see the effect of channel similarity on the system performance, consider an uplink transmission by two devices. The received signal y may be written as:

$$y = h_1 x_1 + h_2 x_2 + n \qquad (1)$$

where $y \in \mathbb{C}^{n_r \times 1}$ and $h_i \in \mathbb{C}^{n_r \times 1}$, $i \in \{1,2\}$ represents the channel for i-th device to the base station, $n \in \mathbb{C}^{n_r \times 1}$ denotes the receiver noise and base station (BS) equipped with $n_r$ receive antennas and each device has one transmit antenna. Although an advanced SIC receiver such as MPA, EPA, MAP, ESE or linear receiver such as MMSE may be used, for the purpose of illustration, a linear zero-forcing (ZF) receiver $$v_i = \frac{1}{\gamma_i}(h_i^* h_i)^{-1} h_i^*,$$

i=1, 2 may be used in the derivation. Here, $\gamma_i$ is a power normalization factor. The transmit signal is $x_i \in \mathbb{C}$, $i \in \{1,2\}$. The received signal after applying zero-forcing may be written as $$v_1 y = v_1 h_1 x_1 + v_1 h_2 x_2 + v_1 n \qquad (2)$$

In order to demonstrate the high interference from each other signal when the pathloss are similar, one may consider that channel is correlated (assume $h_2 = ch_1$ (i.e., full correlation)). Then one may have:

$$v_1 y = \frac{1}{\gamma_1} x_1 + \frac{c}{\gamma_1} x_2 + v_1 n. \qquad (3)$$

Therefore, the signal to interference and noise ratio (SINR) for the first device, i.e., $SINR_1 = P_1/(N_{0,eff} + cP_2)$ where power of device i=1, 2 is $P_i$ and $N_{0,eff}$ effective noise power. As a result, error floor may be expected due to multi-device/multi-user interference (in addition to the noise enhancement effect of ZF which is a known issue). As may be seen from the above formulation, the higher the level of similarity (e.g., c is close to 1) is, the higher the interference power. When multiple transmit antennas are used at the transmitter, the total transmit power may be equally split between the antennas when an open loop transmission is used. This may be because in the open loop transmission, the transmitter may not adjust the power to each antenna as the transmitter does not have additional information such as CSI for power adjustments per antenna. Therefore, the issue of high interference may exist even if multiple transmit antennas are used.

Figure 4:
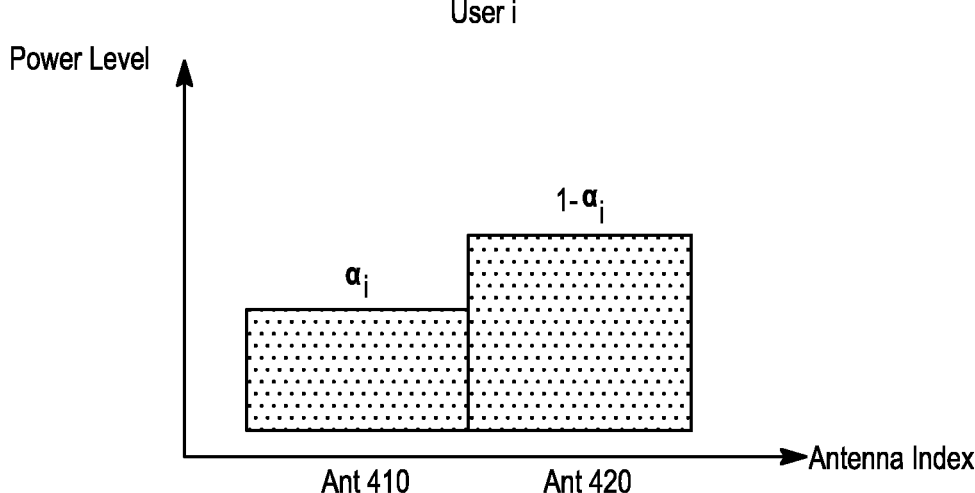
FIG. 4 illustrates an example transmit power adjustment at each antenna.

In particular embodiments, device equipped with multiple antennas may adjust the power of each transmit antenna in order to create a power domain signature, i.e., power of received signal from one device is different from that from the other device. As an illustrative example, consider the scenario where a device with two transmit antennas. FIG. 4 illustrates an example transmit power adjustment at each antenna. The transmit power may be adjusted at the transmitter i (or device i) such that $\alpha_i$ portion of the power is transmitted over the first antenna (Ant 410) of the device and $1-\alpha_i$ portion (the remaining power) of the power is transmitted over the second antenna (Ant 420).

Figure 5:
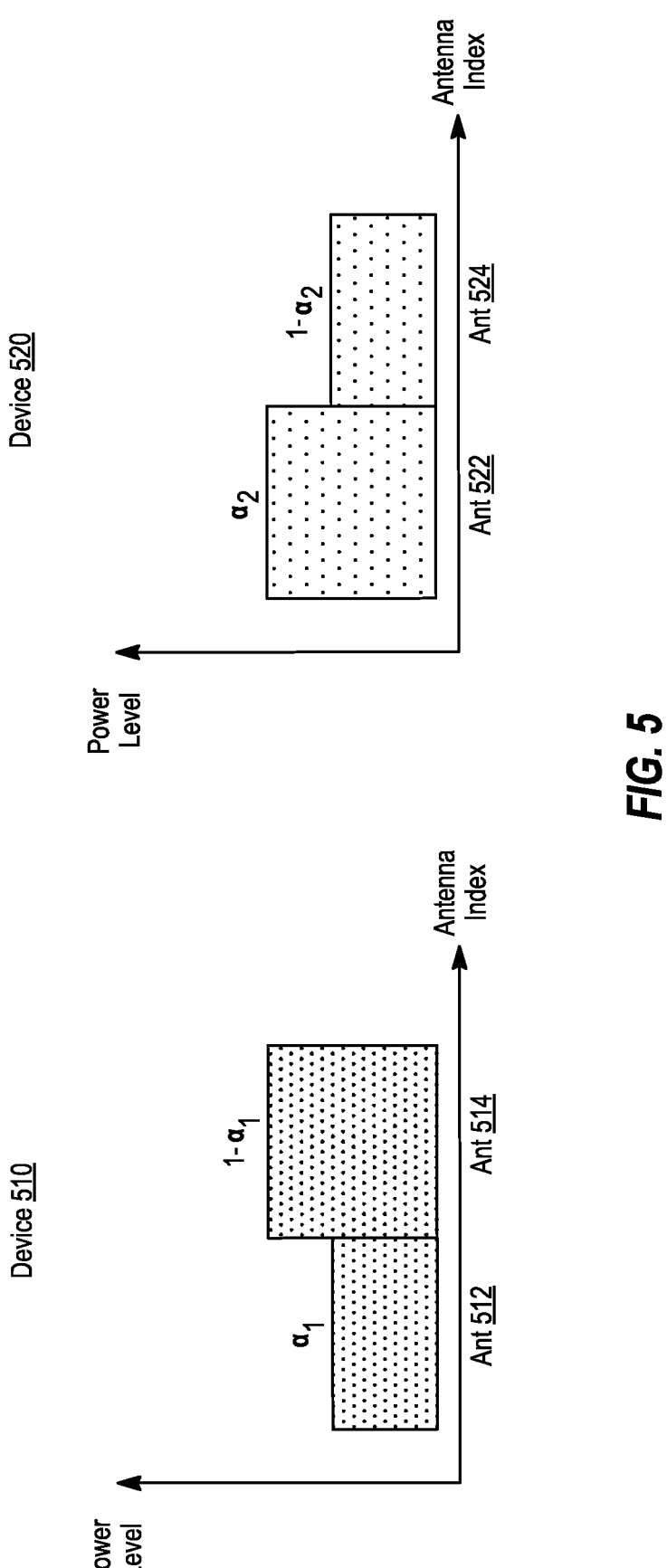
FIG. 5 illustrates an example transmit power adjustment at each antenna of two devices each with two transmit antennas.

In order to illustrate the concept, consider the scenario where two devices each with two transmit antennas and a single antenna at the receiver (base station). FIG. 5 illustrates an example transmit power adjustment at each antenna of two devices each with two transmit antennas. The transmit power of the first antenna (Ant 512) and second antenna (Ant 514) of the first device 510 may be adjusted to $\alpha_1$ and $1-\alpha_1$, respectively. Similarly, the transmit power of the first antenna (Ant 522) and second antenna (Ant 524) of the second device 520 may be adjusted to $\alpha_2$ and $1-\alpha_2$, respectively. Moreover, the channels for the two devices are $h_1=[h_{11}\ h_{12}]\in \mathbb{C}^{1\times n_t}$ and $h_2=[h_{21}\ h_{22}]\in \mathbb{C}^{1\times n_t}$ with $n_t$ representing the number of transmit antennas at the device. Here, $h_{ij}$, $i\in\{1,2\}$, $j\in\{1,2\}$ is the channel coefficient of the j-th antenna of the i-th device. With this setup, the received signal $y\in \mathbb{C}$ at the single-antenna base station may be written as:

$$y = [h_{11}\ h_{12}]\begin{bmatrix} \sqrt{\alpha_1}\,x_1 \\ \sqrt{(1-\alpha_1)}\,x_1 \end{bmatrix} + [h_{21}\ h_{22}]\begin{bmatrix} \sqrt{\alpha_2}\,x_2 \\ \sqrt{(1-\alpha_2)}\,x_2 \end{bmatrix} + n_1. \quad (4)$$

The transmit signal is $x_i\in \mathbb{C}$, $i\in\{1,2\}$. As an example and not by way of limitation, the transmit signal of each transmitter may be a legacy modulated symbol such as BPSK, $$\frac{\pi}{2} - BPSK,$$

QPSK, 16-QAM, 256-QAM, 1024-QAM or in general m-QAM. As another example and not by way of limitation, transmit signal may be symbol level operation performed symbols such as a symbol from linear spread symbols, scrambled symbols, and nonlinear spread symbols. As yet another example and not by way of limitation, transmit signal may be a symbol obtained from symbol level operations or legacy modulation where bit level operation performed on the bit input to the symbol generating block such as modulator or spreader blocks. As yet another example and not by way of limitation, transmit signal may be a symbol obtained from both symbol level and bit level operations. As a result, the symbols may be the output from a linear spreading block, scrambling block, non-linear spreading block, or a combination thereof. As yet another example and not by way of limitation, transmit signal may be from uniform constellation or non-uniform constellation. As yet another example and not by way of limitation, the symbol may be associated with an MA signature. As yet another example and not by way of limitation, the symbol may not be associated with an MA signature.

With simple manipulations, the received signal may be written as:

$$y = (\sqrt{\alpha_1}\,h_{11} + \sqrt{1-\alpha_1}\,h_{12})x_1 + (\sqrt{\alpha_2}\,h_{21} + \sqrt{1-\alpha_2}\,h_{22})x_1 + n_1 \quad (5)$$

In particular embodiments, controlling the effective channels of the two devices may be achieved by adjusting $\alpha_1$, $\alpha_2$. Therefore, parameters $\alpha_1$, $\alpha_2$ may be controlled to achieve power level difference at the receiver. In other words, $\alpha_1$ and $\alpha_2$ may provide additional degree of freedom to control the power levels of the received signals. Adjusting transmit power at each antenna based on a distinct power scaling coefficient may be an effective solution for addressing the technical challenge of creating a power domain signature as these distinct power scaling coefficients may help achieve power level difference at the receiver side.

In particular embodiments, parameters $\alpha_1$ and $\alpha_2$ may need to be coordinated between the two devices. In other words, at a given transmission, if both parameters $\alpha_1$ and $\alpha_2$ are set at the similar value and the channels are fully correlated, the powers of the received signals from different transmitters may be similar and SIC receiver may fail to decode. When the power of the first antenna of the first device is low, the power of the first antenna of the second device may be high so that the power of the received signal from each transmitter is dissimilar. This may be also interpreted from equation (5) where the effective channel for the first device is $\sqrt{\alpha_1}h_{11}+\sqrt{1-\alpha_1}h_{12}$ and the effective channel for the second device is $\sqrt{\alpha_2}h_{21}+\sqrt{1-\alpha_2}h_{22}$. While differences in the channel coefficients $h_{mn}$, m, n$\in\{1,2\}$ may create differences in the powers of the received signals, $\alpha_i$, i$\in\{1,2\}$ parameters may give additional degree of freedom to create a power difference of the received signals so that SIC receiver is able to separate the multiple transmissions. As such, depending on the level of dissimilarity from channel coefficients and receiver capability, $\alpha_i$, i$\in\{1,2\}$ parameters may be adjusted so that sufficient difference in the powers of received signals exists (or induces different effective channels). This may require coordination on the $\alpha_i$, i$\in\{1,2\}$ values used at the transmitters. In an uplink scenario, BS/network side may assign values of $\alpha_i$ to the transmitters to be used. In a side link scenario, BS/network side may assign values of $\alpha_i$ to the transmitters to be used. In the downlink scenario, BS/network side may use $\alpha_i$ values and inform to the receiver. The $\alpha_i$ values to be used or being used may be signaled using a signaling channel such as RRC, MAC-CE, and DCI.

In particular embodiments, the effective channel may depend on the channel coefficients. Therefore, the BS/network side may need to know these values to determine the channel similarity. As an example and not by way of limitation, uplink reference signal transmitted by the transmitter may be used to measure the pathloss. Such multiple reference signals received from the multiple transmitters may be used by the BS/network side to determine the appropriate $\alpha_i$ values, measurements (e.g., CSI), or both. In particular embodiments, reference signals such as sounding reference signal (SRS), demodulation reference signals (DMRS), phase reference signal (PRS), channel state information reference signal (CSI-RS), preamble transmission (e.g., 4-step and 2-step RACH process), system synchronization block (SSB), primary synchronization signal (PSS), secondary synchronization signal (SSS), or other data carrying reference signals may be used by the BS/network side or device side to measure, calculate, or determine the level of channel similarity among other functionalities of these signals.

For the purpose of illustration, consider the scenario where channels are correlated (assume full correlation model by $h_2 = ch_1$ for simplicity of discussion):

$$y = [h_{11} \ h_{12}] \begin{bmatrix} \sqrt{\alpha_1} \, x_1 \\ \sqrt{(1-\alpha_1)} \, x_1 \end{bmatrix} + c[h_{11} \ h_{12}] \begin{bmatrix} \sqrt{\alpha_2} \, x_2 \\ \sqrt{(1-\alpha_2)} \, x_2 \end{bmatrix} + n_1 \tag{6}$$

$$y = [\sqrt{\alpha_1} \, h_{11} + \sqrt{(1-\alpha_1)} \, h_{12}] x_1 + [c\sqrt{\alpha_2} \, h_{11} + c\sqrt{(1-\alpha_2)} \, h_{12}] x_2 + n_1. \tag{7}$$

In this case, the effective channel for the first device is $h_{1,eff} = \sqrt{\alpha_1} h_{11} + \sqrt{(1-\alpha_1)} h_{12}$ and the effective channel for the second device is $h_{2,eff} = c\sqrt{\alpha_2} h_{11} + c\sqrt{(1-\alpha_2)} h_{12}$. By adjusting $\alpha_1$ and $\alpha_2$, the power of the received signals may be controlled. This power level difference may help the SIC receiver decode the signal.

The above discussion indicates that depending on the level of similarity of the propagation channel, $\alpha_i$ values of each transmit antenna of a given transmitter may be adjusted considering the $\alpha_i$ values being used at other transmitters. The $\alpha_i$ values may be determined by the availability of channel similarity/dissimilarity information such as CSI, number of antennas at each transmitter, number of transmitters/devices/sensors simultaneously accessing the channel, physical resources (e.g., bandwidth, number of subcarriers, number of symbols, number of resource blocks (RBs), and number of resource elements (REs)), and modulation and coding scheme (MCS) used. Therefore, by appropriately adjusting the power level of each antenna to suit the system configuration, the embodiments disclosed herein may be optimized to work well in the general multiple access and/or broadcast channels or side links (device to device links).

Figure 6:
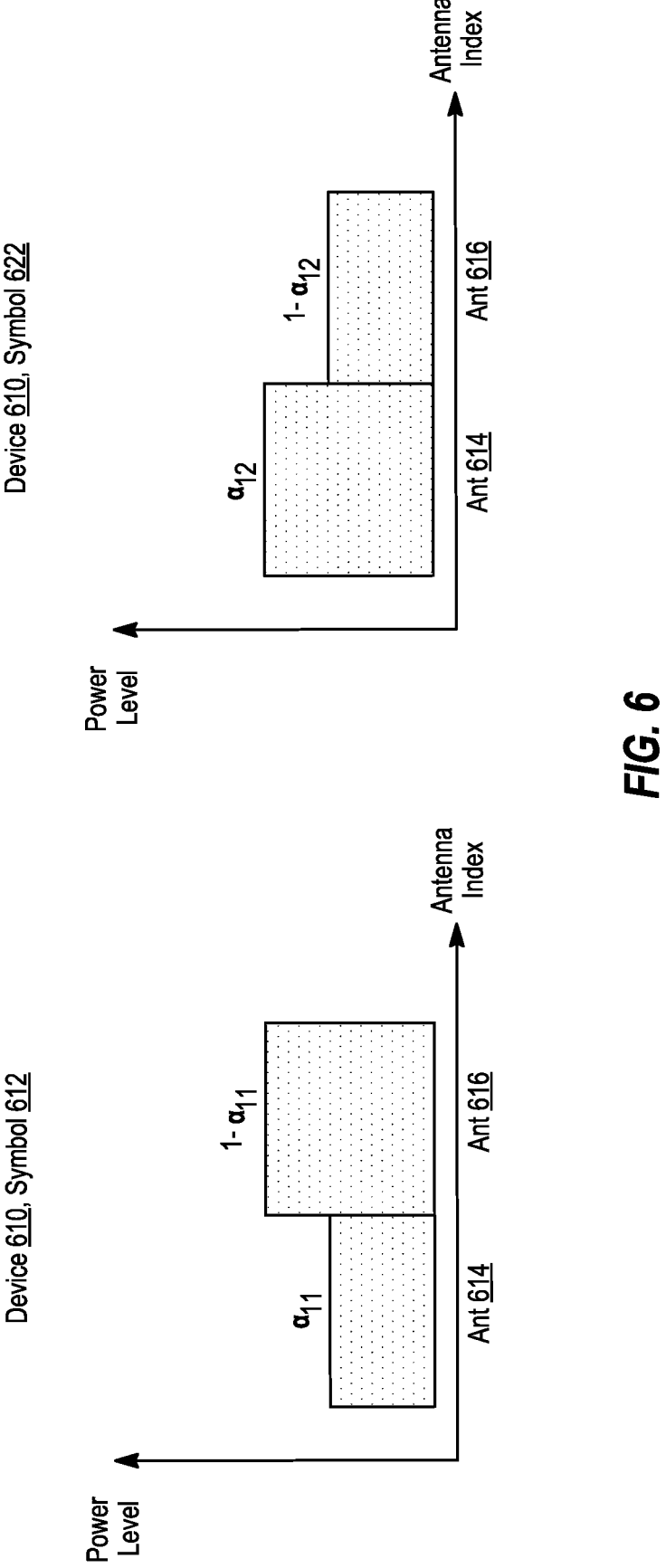
FIG. 6 illustrates an example transmit power adjustment at each antenna over different symbols for a given device.

When the power levels of the received signals are dissimilar, it may help the SIC receiver to decode the symbol. In other words, the power-level difference may be viewed as a power domain signature using multiple antennas. In order to maintain the average error rate for all the devices compared to transmission from individual antenna with equal power, the power levels of antennas (i.e., $\alpha_i$) may be adjusted within a transmission (over multiple symbols) for a given device. As an example and not by way of limitation, in a scenario where there are two transmit antennas, if a first symbol and second symbol from the first device are denoted as $x_{11}$ and $x_{12}$, the first antenna may adjust the power level $\alpha_{11}$ (therefore, $1-\alpha_{11}$ power level in the second antenna) for the symbol $x_{11}$ while the first antenna may adjust the power level $\alpha_{12}$ (therefore, $1-\alpha_{12}$ power level in the second antenna) for the symbol $x_{12}$. As a result, over a set of symbols, the average power levels from each antenna may be similar. This method may have the advantages of utilizing diversity of the multiple antennas of the same device and utilizing multi-user diversity of the system. FIG. 6 illustrates an example transmit power adjustment at each antenna over different symbols for a given device. On device 610, the first antenna (Ant 614) may adjust the power level $\alpha_{11}$ and the second antenna (Ant 616) may adjust the power level $1-\alpha_{11}$ for symbol 612. On the device 610, the first antenna (Ant 614) may adjust the power level $\alpha_{12}$ and the second antenna (Ant 616) may adjust the power level $1-\alpha_{12}$ for symbol 622. Adjusting the power levels of antennas within a transmission over multiple symbols for a given device may be an effective solution for addressing the technical challenge of maintaining the average error rate for all the devices compared to equal power transmission from individual antenna as such approach may effectively utilize the diversity of the multiple antennas of the same device and the multi-device/multi-user diversity of the system. In an alternative implementation, the power of transmitted symbols from each antenna may be controlled/adjusted/modified by the amplitude of the symbol/signal.

In particular embodiments, the symbols/signals from each antenna in general may be CP-OFDM, DFT-s-OFDM or other waveform-based symbols, constellation symbols or group of constellation symbols.

For open loop transmission, signals with equal power from the antennas may be transmitted. In particular embodiments, the antenna power adjustment coefficients may be set to achieve equal power from each antenna. Therefore, equal power transmission from all antennas may be a special scenario.

Figure 7:
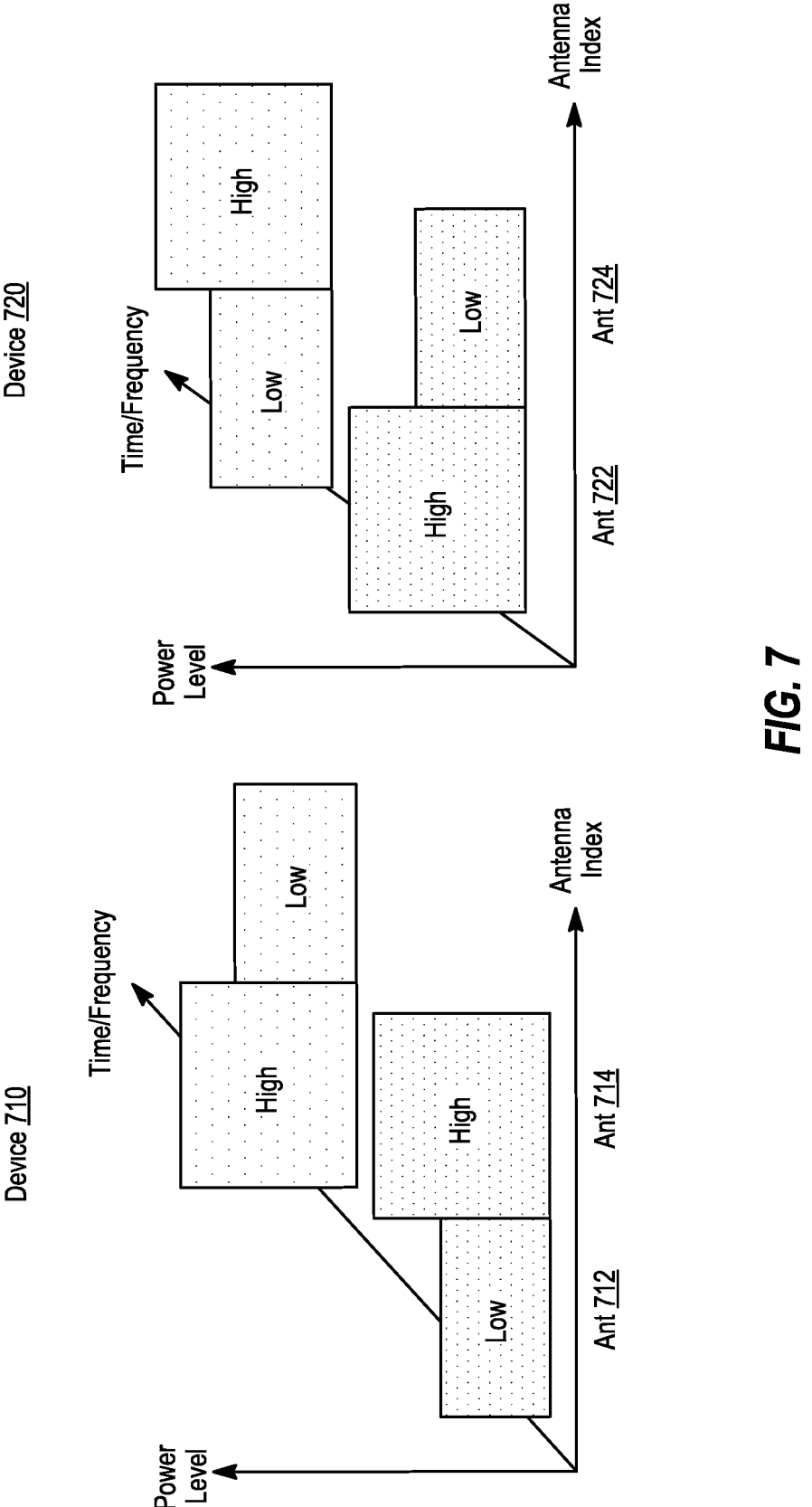
FIG. 7 illustrates an example transmit power adjustment at each antenna over different symbols for two devices and variations over time domain or frequency domain.

The current New Radio (NR) supports waveforms such as CP-OFDM and DFT-s-OFDM. The symbols may be NR legacy modulation symbols, output from a symbol-level processing block, MA signature embedded symbols, other transmit signal such as low-PAPR sequences/signals (e.g., ZC sequences or computer-generated sequences), or uniform or non-uniform constellation symbols. These symbols may be mapped to the resource elements of the OFDM resource grid. These symbols may be therefore mapped onto the time, frequency, or both. FIG. 7 illustrates an example transmit power adjustment at each antenna over different symbols for two devices and variations over time domain or frequency domain. The power level may be adjusted differently for the first antenna (Ant 712) and the second antenna (Ant 714) in device 710 over time or frequency domain. Similarly, the power level may be adjusted differently for the first antenna (Ant 722) and the second antenna (Ant 724) in device 720 over time or frequency domain. In particular embodiments, the power levels may be adjusted in the symbols in time domain, frequency domain, or both time and frequency domains. Moreover, from one resource location to another, power level may be different from one another. As a result, the embodiments disclosed herein may have a technical advantage of applicability in low frequency range or moderate/high frequency range as multiple antennas can be used in any operating frequency.

Figure 8:
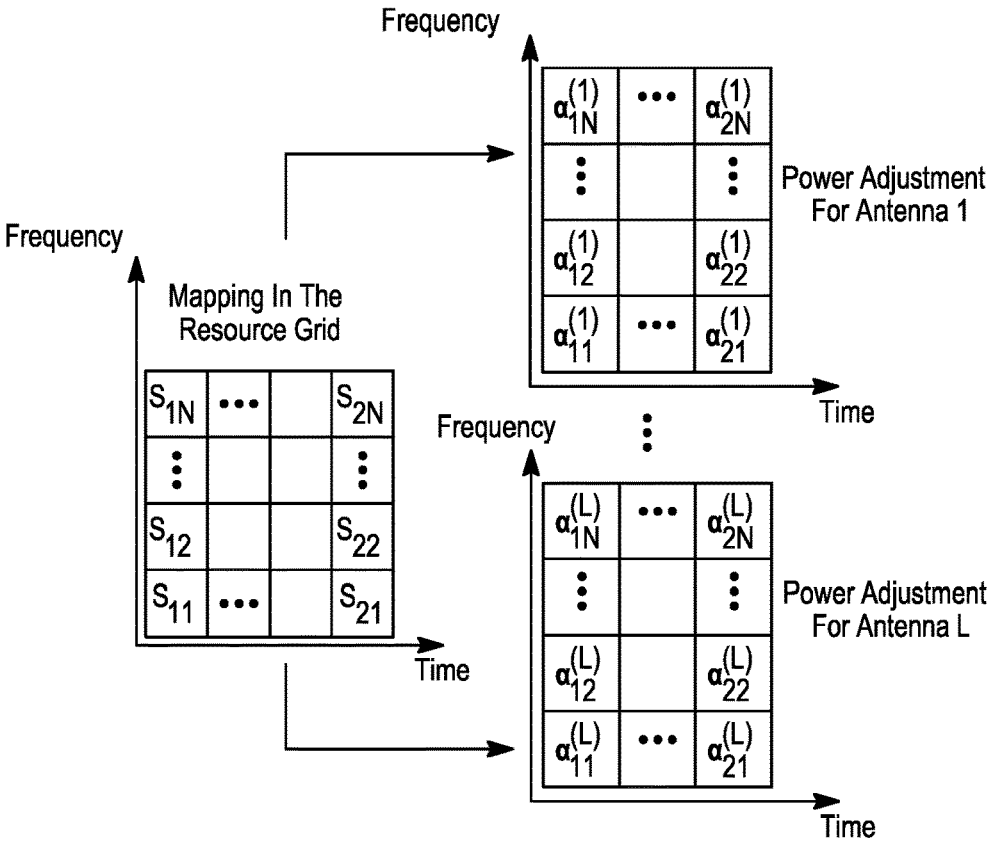
FIG. 8 illustrates an example symbol mapping in an OFDM resource grid.

FIG. 8 illustrates an example symbol mapping in an OFDM resource grid. As an example and not by way of limitation, consider a symbol sequence $s_{11}$, $s_{12}$, . . . . Consider the scenario where symbols are first mapped in the frequency domain and then in the time domain. Alternatively, symbols may be first mapped in the time domain and then in the frequency domain. The mapped symbols may be scaled by the power scaling coefficients for each antenna port indexed from 1, . . . , L, as shown on the right-hand side of FIG. 8. As described earlier, these power scaling coefficients may create dissimilar power levels at the received signal in order to perform the detection more effectively and efficiently.

In particular embodiments, power scaling coefficients may be signaled, computed, or determined at the transmitter side. The per-antenna power scaling coefficients may be signaled to a transmitter side from the network/BS side in the uplink scenario. In the downlink scenario, the per-antenna power scaling coefficients may be used at the BS side and signaled to the receiver side. In the side link scenarios, the per-antenna power scaling coefficients may be signaled to both transmitter and receiver sides from the network side/BS.

In particular embodiments, power scaling of a signal may be achieved by controlling the symbol amplitude, i.e., square root of power scaling coefficient. For example, $\sqrt{\alpha}s$ has a power $\alpha$ where $s$ is a power normalized symbol, i.e., $E(|s|^2)=1$ with $E(.)$ represents the expectation operation. Here $\alpha$ is referred as power scaling coefficient where as $\sqrt{\alpha}$ is referred as amplitude scaling coefficient. As a result, power adjustment may be carried out by adjusting the amplitude.

In particular embodiments, both the transmitter and receiver may exchange values in a table using signaling. Table 1 lists example power scaling coefficients for a transmit antenna. Note that power scaling coefficient may be $1-\alpha$ for a second antenna. Signaling methods such as RRC, MAC-CE, DCI, a combination of these signaling methods, or other signaling methods may be used to exchange the information. Each device may obtain an index from the table. The index may be assigned from the network side through the signaling methods. Alternatively, a device may select an index from the table randomly or based on some measurements or information available to the device. In particular embodiments, the first wireless endpoint device (e.g., transmitter) may access a table comprising a plurality of sets of power scaling coefficients associated with a plurality of indices, respectively. Any two of the sets of power scaling coefficients may be different from each other. The first wireless endpoint device may further select the first and second power scaling coefficients from a first set of power scaling coefficients and the third and fourth power scaling coefficients from a second set of power scaling coefficients. In particular embodiments, the first set of power scaling coefficients and the second set of power scaling coefficients may correspond to a same index. However, the first wireless endpoint device may select the first and second power scaling coefficients from the set of power scaling coefficients corresponding to the same index in a first order and the third and fourth power scaling coefficients from the set of power scaling coefficients corresponding to the same index in a second order. The first order and the second order may be different. As an example and not by way of limitation, the second order may be reverse to the first order.

In particular embodiments, the first wireless endpoint device (e.g., receiver) may generate a table comprising a plurality of controlling parameters associated with a plurality of indices, respectively. Any two of the controlling parameters may be different from each other. In particular embodiments, the first wireless endpoint device may select a plurality of controlling parameters to use based on a single index. However, the way to select each controlling parameter may be different (e.g., based on a different order), thereby resulting the plurality of controlling parameters different from each other. Accordingly, transmitting the respective controlling parameter to each of the plurality of second wireless endpoint devices may comprise signaling the generated table to each of the plurality of second wireless endpoint devices. In particular embodiments, each controlling parameter may comprise a plurality of power scaling coefficients for the plurality of respective antennas associated with each second wireless endpoint device.

As an example and not by way of limitation, a device may draw a number at random and use the corresponding values of the index. A specific example may be mod($R_n$, $R_{max}$) where $R_n$ is the generated random number and $R_{max}$ is the size of the table ($R_{max}$ is 6 in Table 1) and mod(.,.) is the modulo operation. Alternatively, $R_{max}$ for a device may also be limited to smaller than the number of entries in the table. For example, index for a device may be obtained by mod($R_n$, $\hat{R}_{max}$) where $\hat{R}_{max}=4$ (although Table 1 has 6 entries). This may provide an implicit approach to limit the usage of power scaling coefficients just by signaling a single parameter (e.g., $\hat{R}_{max}$) but using the same table. Alternatively, a device may obtain the index by a formulation. As an example and not by way of limitation, the index may be obtained as a function of correlation level, number of antennas, antenna correlation level, transmission block (TB) size, etc. This method may provide an approach to map to an index in the table based on system parameters but using a single table. In a given system, devices may use one or more of these methods simultaneously.

TABLE 1

| Power scaling coefficient for a transmit antenna. | |
| --- | --- |
| Index | Power scaling coefficient $\alpha$ for a first antenna |
| 1 | [0.1, 0.9] |
| 2 | [0.9, 0.1] |
| 3 | [0.2, 0.8] |
| 4 | [0.8, 0.2] |
| 5 | [0.3, 0.7] |
| 6 | [0.7, 0.3] |

In particular embodiments, there may be more than one table. For example, a table for different number of antennas, antenna configuration, channel conditions/parameters (e.g., correlation), number of devices, or a combination thereof. Although the power scaling coefficient is a real number, a discrete/quantized value may be used for reduced signaling overhead without significant sacrifice of the system performance.

In particular embodiments, a device may compute the power scaling coefficients to be used based on a formulation. The input to the function may include one or more of a channel similarity parameter such as correlation level, number of antennas, transmission block (TB) size, device side measurement values, or combinations of these parameters. The formulation may directly compute the power scaling coefficients to be used for each antenna for a sequence of symbols. Formulation based approach may avoid large signaling of table entries and the need for a large memory to store the values. Such approach may also directly compute the power scaling coefficient based on the available information. In particular embodiments, the first wireless endpoint device (e.g., transmitter) may compute, by a formulation, each of the first, second, third, and fourth power scaling coefficients based on one or more of a channel similarity parameter, a number of the plurality of antennas, a size associated with a transmission block, or a measurement value determined by the first wireless endpoint device.

In particular embodiments, the first wireless endpoint device (e.g., receiver) may compute, by a formulation, the respective controlling parameter for each corresponding second wireless endpoint device based on one or more of a channel similarity parameter, a number of the plurality of antennas associated with the corresponding second wireless endpoint device, a size associated with a transmission block, or a measurement value determined by the corresponding second wireless endpoint device. Computing the power scaling coefficients based on various channel similarity information may be an effective solution for addressing the technical challenge of determining the power scaling coefficients/factors as such information may help determine how to adjust the power scaling coefficients to achieve the effective channel for each device.

In particular embodiments, generating the signal from the sequence of symbols may further comprise modifying amplitude and phase of the sequence of symbols based on one or more of spreading sequencing or scrambling sequencing. In case of the first wireless endpoint device being a receiver, the first wireless endpoint device may generate the respective controlling parameter for each corresponding second wireless endpoint device based on one or more of spreading sequencing or scrambling sequencing. Spreading or scrambling sequences may modify both amplitude and phase of the signal/symbol. In a special case of spreading or scrambling, amplitude alone may be modified (e.g., zero phase modification). Therefore, spreading sequences, scrambling sequences, or both may be reused to modify the amplitude scaling coefficients of a stream of symbols/signals. As described earlier, the power adjustment may be achieved by using spreading or scrambling techniques. In order to achieve the desired effect of different power levels in different antennas, the spreading/scrambling per antenna basis should be performed (as opposed to using a single spreading/scrambling sequence across all transmit antennas). As an example and not by way of limitation, the first spreading sequence may be the amplitude scaling coefficients used across the symbols in a first antenna and the second spreading sequence may be the amplitude scaling coefficients used across the symbols in a second antenna. More than two antennas can also be supported. Similarly, spreading sequence may be defined across antennas and multiple spreading sequences used from symbol to symbol.

Figure 9:
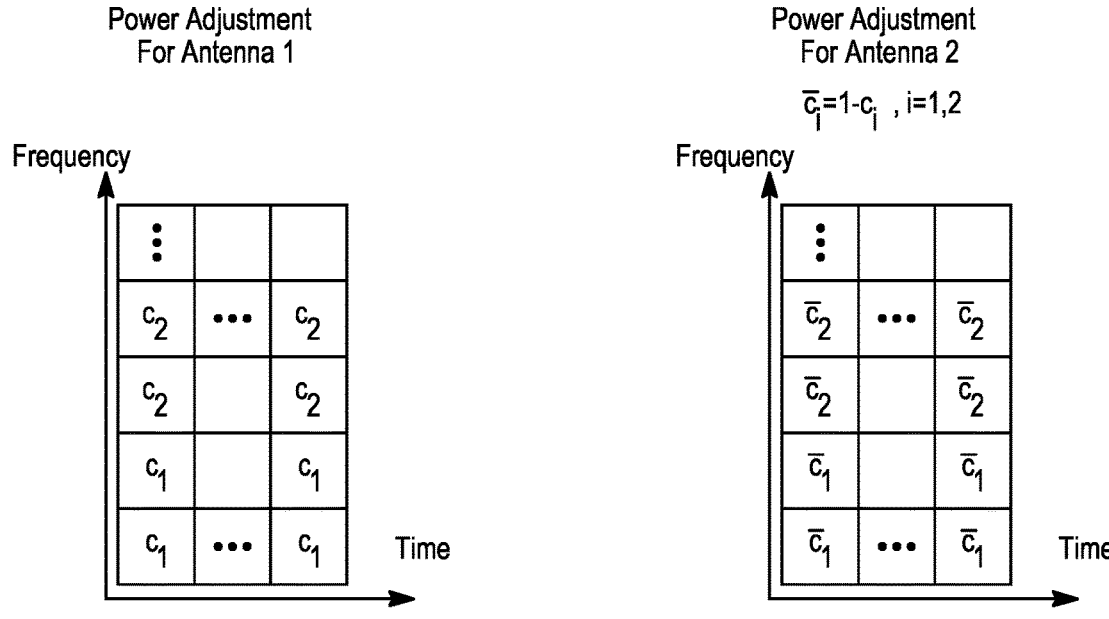
FIG. 9 illustrates an example interpretation of power scaling coefficient for a system with two transmit antennas.

In particular embodiments, the power scaling coefficients obtained from tables, formulation, or spreading/scrambling may be further mapped to the entire resource grid. The first wireless endpoint device may map the first and second power scaling coefficients or the third and fourth power scaling coefficients (or the respective controlling parameter for each corresponding second wireless endpoint device) to a resource grid for orthogonal frequency division multiplexing (OFDM), wherein the resource grid is based on time and frequency. As an example and not by way of limitation, two power scaling coefficients based on tables are described as follows. With some other parameters such as symbol group size G, the power scaling coefficients for the entire resource grid may be computed. For example, consider the two coefficients are $[c_1, c_2]$. $c_1$ and $c_2$ may be respectively repeated G times to obtain power coefficients for 2G symbols and the 2G power coefficients may be duplicated to obtain power coefficients of the length of the resource grid. Note that when G=1, the two coefficients $[c_1, c_2]$ may be repeated to obtain power coefficients of the length of the resource grid. FIG. 9 illustrates an example interpretation of power scaling coefficient for a system with two transmit antennas. In particular embodiments, constructing a power scaling coefficient by repetition or other smaller power coefficients values (i.e., a block of power coefficient values, e.g., $[c_1, c_2]$) may have the advantage of flexibly generating coefficients for any resources grid and lower signaling overhead.

In particular embodiments, the power scaling coefficients for a smaller number of antennas may be used for a larger number of antennas. As an example and not by way of limitation, after the power scaling coefficients for a two-antenna device is obtained, the repeated power scaling coefficients may be used for a device with more than two antennas (e.g. multiple of 2's). For example, if $[c_1, c_2]$ are the coefficients for antenna 1, the power scaling coefficients for antenna 2 may be computed by $[1-c_1, 1-c_2]$. For antenna 3 and antenna 4 respectively, the power scaling coefficients of antenna 1 and antenna 2 may be used. This method may have the advantage of re-using the power scaling coefficients designed for a device with a smaller number of antennas to be used by a device with a larger number of antennas. In another embodiment, the power scaling coefficients for a larger number of antennas may be used for a smaller number of antennas. For example, if $[c_1, c_2]$ and $[d_1, d_2]$ are the coefficients for antenna 1 and antenna 3, respectively, the power scaling coefficients for antenna 2 and 4 may be computed by $[1-c_1, 1-c_2]$ and $[1-d_1, 1-d_2]$, respectively and for a device with 2 antennas, the power scaling coefficients of antenna 1 and antenna 2 may be used. In another embodiment, for a device with 2 antennas, the power scaling coefficients of antenna 3 and antenna 4 may be used. Alternatively, a separate table, a formulation, or other method may be feasible for the device with a larger number of antennas.

Figure 10:
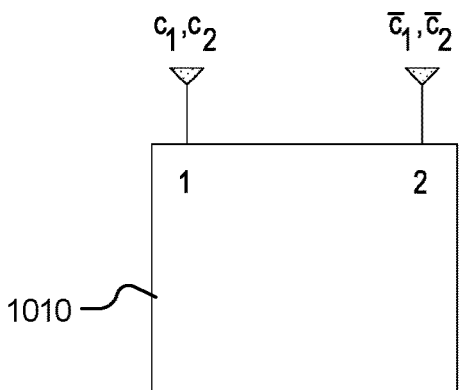
FIG. 10 illustrates an example power scaling coefficient re-assignment.
Figure 10:
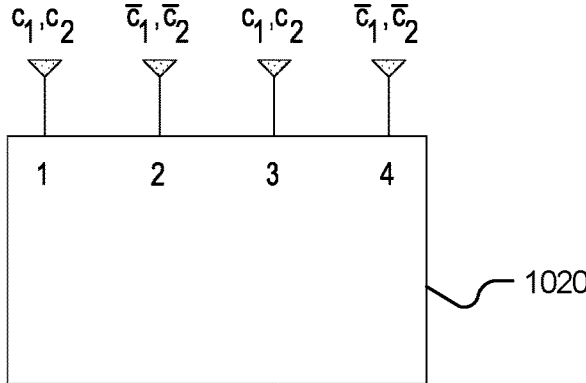

FIG. 10 illustrates an example power scaling coefficient re-assignment. In FIG. 10, the power scaling coefficients of a device 1010 with two antennas are used for a device 1020 with four transmit antennas. In particular embodiments, the power scaling coefficients for a device with a larger number of antennas may also be used by a device with a smaller number of antennas. A subset of the power scaling coefficients for the device with a larger number of antennas may be used for the device with a smaller number of antennas. The subset of power scaling coefficients suitable for the device with a smaller number of antennas may be signaled through a signaling channel. Alternatively, a truncated number of coefficients may be used for the device with a smaller number of antennas. In other words, power scaling coefficients for antenna i of a device with a $L_1$ number of antennas (i=1, . . . , $L_1$) may be obtained by the power scaling coefficients of the device with a $L_2$ number of antennas (such that $L_1 \leq L_2$) by i=j where j is the power scaling coefficients of the device with a $L_2$ number of antennas, j=1, . . . , $L_2$. Alternatively, i=2j+1. In another approach, i=2j.

In particular embodiments, the power scaling coefficients may be applied to the symbols carrying user data. Additionally, the power scaling coefficients may also be applied to the reference signal such as DM-RS, SRS, CSI-RS or others. The power scaling coefficients applied to the reference signal may be the same or different from the power scaling coefficients applied for the symbols carrying user data.

Figure 11:
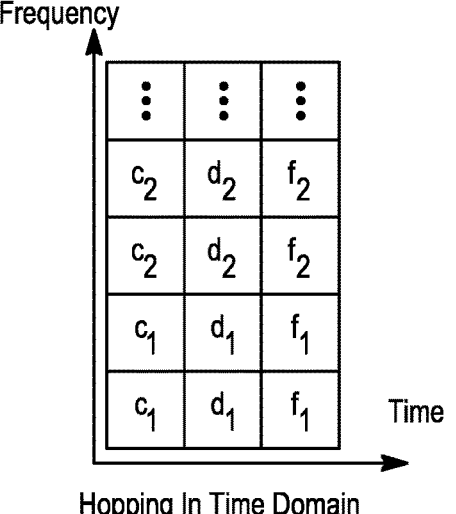
FIG. 11 illustrates an example power scaling coefficient index hopping considering an OFDM based resource grid.
Figure 11:
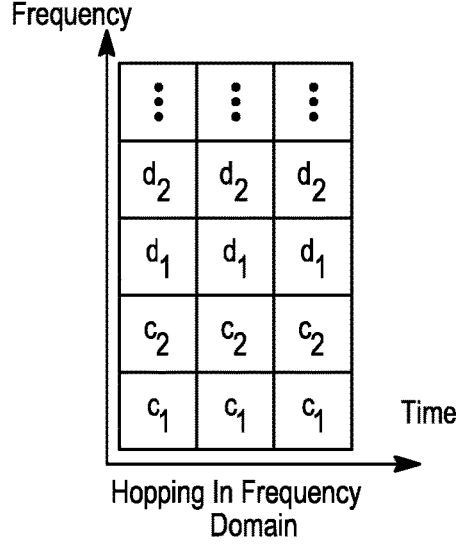

In order to further randomize interference, power domain signature hopping may be applied. FIG. 11 illustrates an example power scaling coefficient index hopping considering an OFDM based resource grid. In the left subfigure of FIG. 11, the coefficient $[c_1, c_2]$ is applied to the first OFDM symbol in the OFDM resource grid while the coefficient $[d_1, d_2]$ is applied in the second OFDM symbol. As such, from the first symbol to the second symbol, power scaling coefficients may have been changed. This may be achieved, for example, by using the index 1 from Table 1 in the first OFDM symbol and another index in the second OFDM symbol. Note that the same index is being used for all subcarriers in the OFDM resource grid. Therefore, this may be referred as hoping in the time domain (i.e., fixed index in the frequency domain). In the right subfigure of FIG. 11, different indices have been applied in the frequency domain. Therefore, this may be referred as hopping in the frequency domain. As such, different power scaling coefficients corresponding to different indices may be used within the OFDM resource grid. Such a pattern of use of different indices of power scaling coefficient may be referred as a hopping pattern. The same hopping pattern may be applied to different antennas or different hopping patterns may be applied to different antennas.

In a similar manner, the formulation-based power scaling coefficients or scrambling/spreading based power scaling coefficients may be used. As an example and not by way of limitation, define additional parameters such as group hopping value (u) and device specific hopping value (v). Such values may be input to the formulation or in generating the spreading/scrambling sequences. In other words, computing each of the first, second, third, and fourth power scaling coefficients by the formulation may be further based on one or more of a group hopping value or a device specific hopping value. Additionally, modifying amplitude and phase of the sequence of symbols may be further based on one or more of a group hopping value or a device specific hopping value.

The advantage of hopping may be that for an OFDM resource grid of a given size, there are many different hopping patterns and devices may randomize the interference (consequently improving the performance). Moreover, when the number of devices is large, hopping patterns may provide a way to generate a large pool of power scaling coefficients from a small number of indices. This may be particularly important in grant-free transmission scenario where only a fraction of devices is active out of a large number of devices. As describe previously, the pool of power scaling coefficients may be expanded by signaling a set of hopping patterns in order to expand the power coefficient pool size. In grant-free transmission scenario, the transmitter side may obtain the power scaling coefficients from the expanded pool, which may be useful especially for scenarios where there are a large number of potential devices (to support massive connection density). As an example and not by way of limitation, devices may be clustered by using a cluster (i.e., a group of devices) specific group hopping value u and still generate unique power scaling coefficients using a unique device specific hopping value v. The expanded power scaling coefficients with a hopping pattern may also be used in the grant-based scenario where power scaling coefficients to be used are specified using, e.g., an index to the table entry (such as Table 1) and a specific hopping pattern. The hopping pattern may be obtained by some parameters such as resource grid size, basic power scale coefficients, time or frequency hopping, group hopping value (u) and device specific hopping value (v), etc.

The power scaling coefficients obtained by aforementioned embodiments may be referred as power domain signature or MA signature in general. As such, the detector/decoder may utilizing the power scaling coefficients in order to improve the system performance, support massive connectivity and overcome the performance loss due to channel similarity.

In particular embodiments, low peak-to-average power ratio (PAPR) or low-cubic metric may be important parameters to quantify the impact of amplifier non-linearity on the signal or system performance. As such, any metric that quantifies the impact of amplifier non-linearity may be used. In the machine type of devices (i.e., the mMTC scenario), low-PAPR properties may be important as devices may use power amplifiers with simple or low hardware complexity or low cost.

When the symbols applying power scaling coefficients are mapped to an OFDM resource grid, the PAPR or cubic metric of the resulting signal may change as compared to the signal without power scaling coefficients applied. As a result, power amplifier may operate in the non-linear region for the waveforms such as CP-OFDM (cyclic-prefix orthogonal frequency division multiplexing), DFT (discrete Fourier transform) spread CP-OFDM (i.e., DFT-s-OFDM), or others. As an example and not by way of limitation, the PAPR for some power scaling coefficients may be lower, similar, or higher compared to without using the power scaling coefficients. As such, depending on the device capability, power scaling coefficients may be used. For example, for a given waveform such as CP-OFDM or DFT-s-OFDM, power scaling coefficients may be categorized according to the PAPR. The low PAPR power scaling coefficients may be used by cell-edge devices (e.g., by assignment or at random or by limiting the table entry access) as these devices are transmitting high power and therefore may operate near the non-linear region of the power amplifier. On the other hand, the high PAPR power scaling coefficients may be used by cell-center devices (e.g., by assignment or at random) as these devices are not transmitting high power and therefore may not operate at the non-linear region of the power amplifier. Such categorization of power scaling coefficients based on PAPR, cubic metric, or other metric may be signaled to the transmitter side through signaling.

Figure 12:
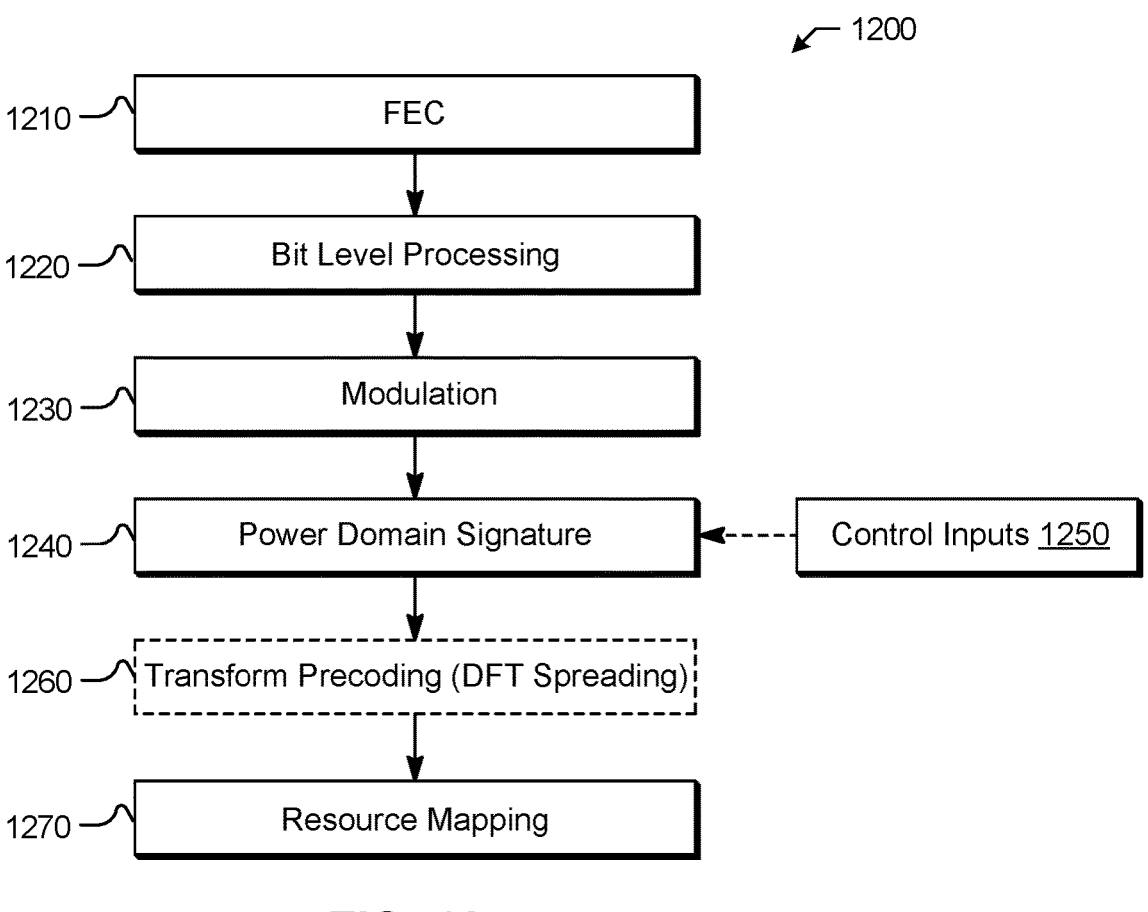
FIG. 12 illustrates an example flow diagram in transmit processing.

The embodiments disclosed herein may be implemented in different methods. FIG. 12 illustrates an example flow diagram 1200 in transmit processing. At step 1210, forward error correction (FEC) may take the information bit (i.e., data) and produce a sequence of bits as output, in which one or more parity bits may be added. The output of FEC may be generally referred as coded bits. In particular embodiments, the first wireless endpoint device may generate a plurality of coded bits from a plurality of information bits based on forward error correction. The parity bits may carry redundancy information and be used by the FEC decoder at the receiver side for decoding the information bits. As a result, the length of the information bits may be smaller than the length of the coded bits. At step 1220, the bit-level processing may help achieve the transmission separation by randomizing the signals from other devices. As an example and not by way of limitation, randomization may comprise scrambling or interleaving. In particular embodiments, the first wireless endpoint device may apply bit-level processing to the plurality of coded bits. At step 1230, the modulation may then take the coded bits (with or without one or more bit level processing such as bit interleaving/scrambling) as the input and produce a sequence of symbols. The symbol output from the modulation may be commonly referred as modulated symbols. As an example and not by way of limitation, modulation may be a legacy modulation such as BPSK, $$\frac{\pi}{2} - BPSK,$$

QPSK, 10-VAM, 200-VAM, 1024-QAM, m-QAM or other modulation operation. In particular embodiments, the first wireless endpoint device may generate the sequence of symbols from the plurality of coded bits based on a modulation. The modulation may also perform modified modulation such as multi-dimensional modulation or direct bits to multiple symbol mapping. Although not shown in FIG. 12, the output of the modulation may be further processed by symbol level processing. The symbol level processing may perform operations such as spreading (linear/non-linear/sparse), scrambling, symbol interleaving, or other symbol level operations. The output of the modulation or the symbol level processing may be the input to the multi-antenna power domain signature at step 1240.

In particular embodiments, the power domain signature may take the sequence of symbols as the input and produce a sequence of symbols of the same length. The symbol power levels may be adjusted according to the power scaling coefficients. In particular embodiments, a symbol power may be adjusted by controlling its amplitude. As an example and not by way of limitation, for the symbol $\sqrt{a}s$ where a is a scalar and s is a complex symbol (such as a modulated symbol), the power of s may be normalized to 1. Therefore, symbol $\sqrt{a}s$ may have the power a. As such, the power domain signature may adjust the amplitudes of the symbol sequence according to the control inputs 1250 and produce symbol streams to be mapped to each transmit antenna. In particular embodiments, the control inputs 1250 to the multi-antenna power domain signature may include the parameters to obtain the power scaling coefficients for each antenna such as the number of antennas, the basic power scaling coefficients (e.g., an index to Table 1), and the hopping pattern. Although not explicitly shown, power domain signature may produce multiple outputs suitable for each transmit antenna. In particular embodiments, the power scaling coefficients of one antenna may be related or may be derived from another. As an example and not by way of limitation, for two transmit antennas, the symbol amplitude adjusted for the first antenna may be $\sqrt{a}$ and accordingly, the amplitude adjustment for the other antenna may be $\sqrt{1-a}$. As such, knowing the sequence of symbols for the first antenna may help derive the symbol sequence for the other antenna.

As described previously, the embodiments disclosed herein may also be applied as a special case of spreading/scrambling. As such, no matter whether a separate symbol level processing exists in the transmit processing, based on control inputs, power scaling coefficients may be applied to the modulated symbols within the symbol level processing or otherwise.

The output of the power domain signature for each antenna may be optionally transformed pre-coded (in case of DFT-s-OFDM) at step 1260. Different from FIG. 12, the transform precoding may be applied prior to the power domain signature. In this scenario, the power scaling coefficients may be applied to the symbol sequence applying transform precoding.

The power domain signature embedded or power scaling coefficients applied symbol sequence may be then mapped to the resources to be transmitted by each antenna at step 1270.

In particular embodiments, power control may be based on a set of algorithms and tools by which the transmit power of a signal is controlled to ensure that the signal, to the extent possible, is received by the receiver side at an appropriate power level. In the case of an uplink transmission, the appropriate power may be the received power needed for proper decoding of the information carried by the channel. At the same time, the transmit power should not be unnecessarily high as that may cause unnecessarily high interference to other transmissions. The appropriate transmit power may depend on the channel properties, including the channel attenuation, noise, and interference level at the receiver side. In particular embodiments, the required received power may be directly dependent on the data rate. If the received power is too low, one may either increase the transmit power or reduce the data rate.

In current cellular standard such as 5G NR, the power control, especially for uplink transmission has been specified. For each of the antennas used for transmission, the block of complex-valued symbols may be multiplied with the power control coefficient in order to conform to the transmit power and be mapped from sequence of symbols to resource elements. In particular embodiments, the first wireless endpoint device may determine a transmit power of the generated signal based on a power-control algorithm based on one or more of a maximum allowed transmit power, a target received power, an estimate of a path loss, a fractional path-loss compensation, a subcarrier spacing, a number of resource blocks assigned for transmission, a modulation scheme, a channel-coding rate for transmission, a power adjustment for a closed-loop power control. The power control for an uplink transmission may be described by the following expression:

$$P = \min\{P_{max}, P_0(j) + \alpha(j) \cdot PL(q) + 10\log10(2^{\mu} M_{RB}) + \Delta_{TF} + \delta(l) \quad (8)$$

where P is the transmit power, $P_{max}$ is the maximum allowed transmit power, $P_0(.)$ is a network-configurable parameter that may be viewed as a target received power. PL(.) is an estimate of the uplink path loss, $\alpha(.)$ is a network-configurable parameter ($\leq 1$) for fractional path-loss compensation, $\mu$ relates to the subcarrier spacing. $M_{RB}$ is the number of resource blocks assigned for the transmission while $\Delta_{TF}$ relates to the modulation scheme and channel-coding rate used for the transmission, and $\delta(.)$ is the power adjustment due to the closed-loop power control. The expression describes the uplink power control per carrier.

The term $P_0(j)+\alpha(j)PL(q)$ may represent the basic open-loop power control supporting fractional path-loss compensation. In the case of full path-loss compensation, corresponding to $\alpha=1$ and under the assumption that the path-loss estimate PL is an accurate estimate of the uplink path loss, the open-loop power control may adjust the transmit power so that the received power aligns with the "target received power" $P_0(j)$. The quantity $P_0(j)$ may be provided as part of the power-control configuration and may typically depend on the target data rate but also on the noise and interference level experienced at the receiver. The device may be assumed to estimate the uplink path loss based on measurements on some downlink signal. The accuracy of the path-loss estimate thus may partly depend on what extent downlink/uplink reciprocity holds. Especially, in the case of FDD operation in paired spectra, the pathloss estimate may not be able to capture any frequency-dependent characteristics of the path loss.

In addition to the aforementioned reasons, in the embodiments disclosed herein, parameters in the basic open-loop power control may be modified. As an example and not by way of limitation, instead of $\alpha$ being a single scalar value, a sequence of values for each antenna may be used in accordance to the desired power scaling coefficients. Therefore, a sequence of fractional path-loss compensation values may be used (instead of a single value). These values may be computed at the device based on the information/configurations received from the network/BS side.

The term $10 \log 10(2^{\mu} M_{RB})$ may reflect the fact that, everything else unchanged, the received power and thus also the transmit power, should be proportional to the bandwidth assigned for the transmission. Thus, assuming full path-loss compensation with $\alpha=1$, $P_0(j)$ may be more accurately described as a normalized target received power. Especially, assuming full path-loss compensation, $P_0(j)$ may be the target received power assuming transmission over a single resource block with a given numerology.

In addition to the aforementioned reasons, the embodiments disclosed herein may be implemented by adjusting normalized target received power or parameters in the bandwidth dependent term, i.e., $10 \log 10(2^{\mu} M_{RB})$. Instead of a single value for a given carrier j, a sequence of values for each antenna in accordance with the desired power scaling coefficients may be used.

The term $\Delta_{TF}$ may model how the required received power varies when the number of information bits per resource element varies due to different modulation schemes and channel-coding rates. Instead of a single value for $\Delta_{TF}$, a sequence of values for each antenna in accordance with the desired power scaling coefficients may be used.

The term $\delta(l)$ may be the power adjustment related to closed-loop power control. The network may adjust $\delta(l)$ by a certain step given by a power-control command provided by the network, thereby adjusting the transmit power based on network measurements of the received power. The power-control commands may be carried through signaling. Instead of a single value for $\delta(l)$, a sequence of values for each antenna in accordance with the desired power scaling coefficients may be used.

In summary, although not exhaustive, one or more than one parameter related to the power control may be adjusted. This may be especially applicable for uplink and side link transmission scenarios.

As can be seen, another technical advantage of the embodiments may include flexibility in implementations and adoptions to standards as the embodiments can be implemented in multiple ways such as power domain non-orthogonal multiple access, power control, spreading sequence etc. and on top of existing state-of-the-art non-orthogonal multiple access schemes such as SCMA, MUSA, IGMA, RSMA, LCRS, etc.

Figure 13:
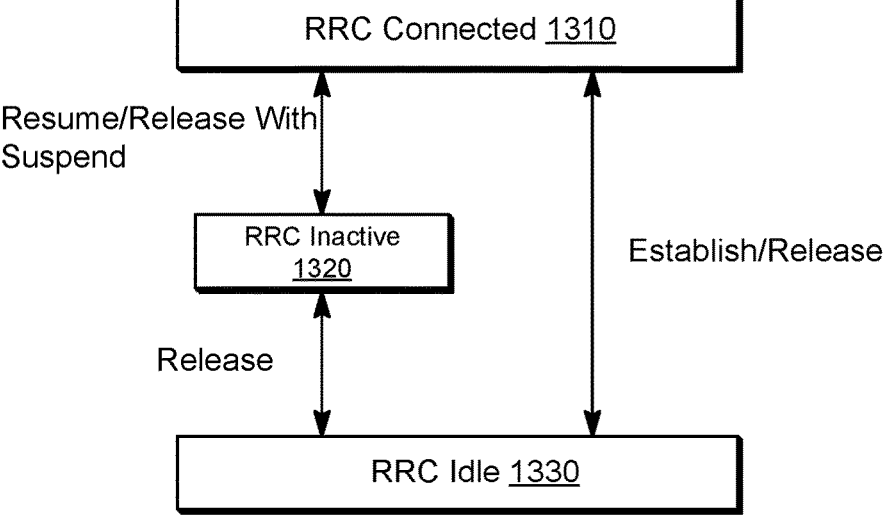
FIG. 13 illustrates example RRC states in 5G NR.

In particular embodiments, a device or sensor may be considered in one of RRC (radio resource control) states at a given time within the network. As the number of devices are large, to save the network resources, some devices may be in RRC IDLE or RRC INACTIVE states with limited capabilities. FIG. 13 illustrates example RRC states in 5G NR. In mMTC scenario, a large number of devices may be in RRC INACTIVE or IDLE states with sporadic and infrequent data transmissions. As such, the embodiments disclosed herein may be applied to a device in any of the RRC states such as RRC CONNECTED 1310, INACTIVE 1320, IDLE 1330, or any other RRC states.

In particular embodiments, state transition may be triggered/activated by the network side. As such, when a device/sensor is camped in a particular RRC state, the instructions may be received to the device/sensor via RRC transitioning signaling such as RRC release messages or release with suspend. The parameters or configurations of the embodiments disclosed herein may also be signaled to the device/sensor side through such state transitioning signaling (in part or in full). Furthermore, other signaling or data channels available in different RRC states may also be used by the network to configure the parameters of the embodiments disclosed herein. These may include data channels such as PUSCH, PDSCH, PUCCH, PDCCH, paging mechanism, SIB, RAR, or others.

In particular embodiments, the first wireless endpoint device may detect a particular second wireless endpoint device is in a radio-resource-control (RRC) state. In another embodiment, the first wireless endpoint device may instruct a particular second wireless endpoint device to transition into a particular RRC state. Accordingly, transmitting the controlling parameter to the particular second wireless endpoint device may be based on an RRC state transition message, and the RRC state transition message may comprise a request to transition the RRC state. The first wireless endpoint device may transmit, to each of the plurality of second wireless endpoint devices, a respective request for one or more inputs for generating the respective controlling parameter. As an example and not by way of limitation, the one or more inputs may comprise one or more of a number of the plurality of antennas associated with the second wireless endpoint device, a basic power control coefficient, a resource configuration, a resource allocation, a modulation scheme, a coding scheme, a hopping pattern, a device specific hopping value, or a group hopping value. The first wireless endpoint device may further receive, from each of the plurality of second wireless endpoint devices, the requested inputs. In particular embodiments, transmitting the respective controlling parameter to each second wireless endpoint device may comprise signaling the respective controlling parameter via a signaling channel determined based on one or more propagation channel parameters.

In order to properly function the embodiments disclosed herein, different nodes in the system may need to exchange information among them. As described previously, the techniques disclosed herein may be applied in uplink, downlink and side link transmission scenarios.

In particular embodiments, the first wireless endpoint device may receive, from a second wireless endpoint device, a request for one or more inputs for generations of power scaling coefficients. As an example and not by way of limitation, the one or more inputs may comprise one or more of a number of the plurality of antennas, a basic power control coefficient, a resource configuration, a resource allocation, a modulation scheme, a coding scheme, a hopping pattern, a device specific hopping value, or a group hopping value. The first wireless endpoint device may further transmit, to the second wireless endpoint device, the requested inputs. In particular embodiments, transmitting the requested inputs may comprise signaling the requested inputs via a signaling channel determined based on one or more propagation channel parameters.

Figure 14:
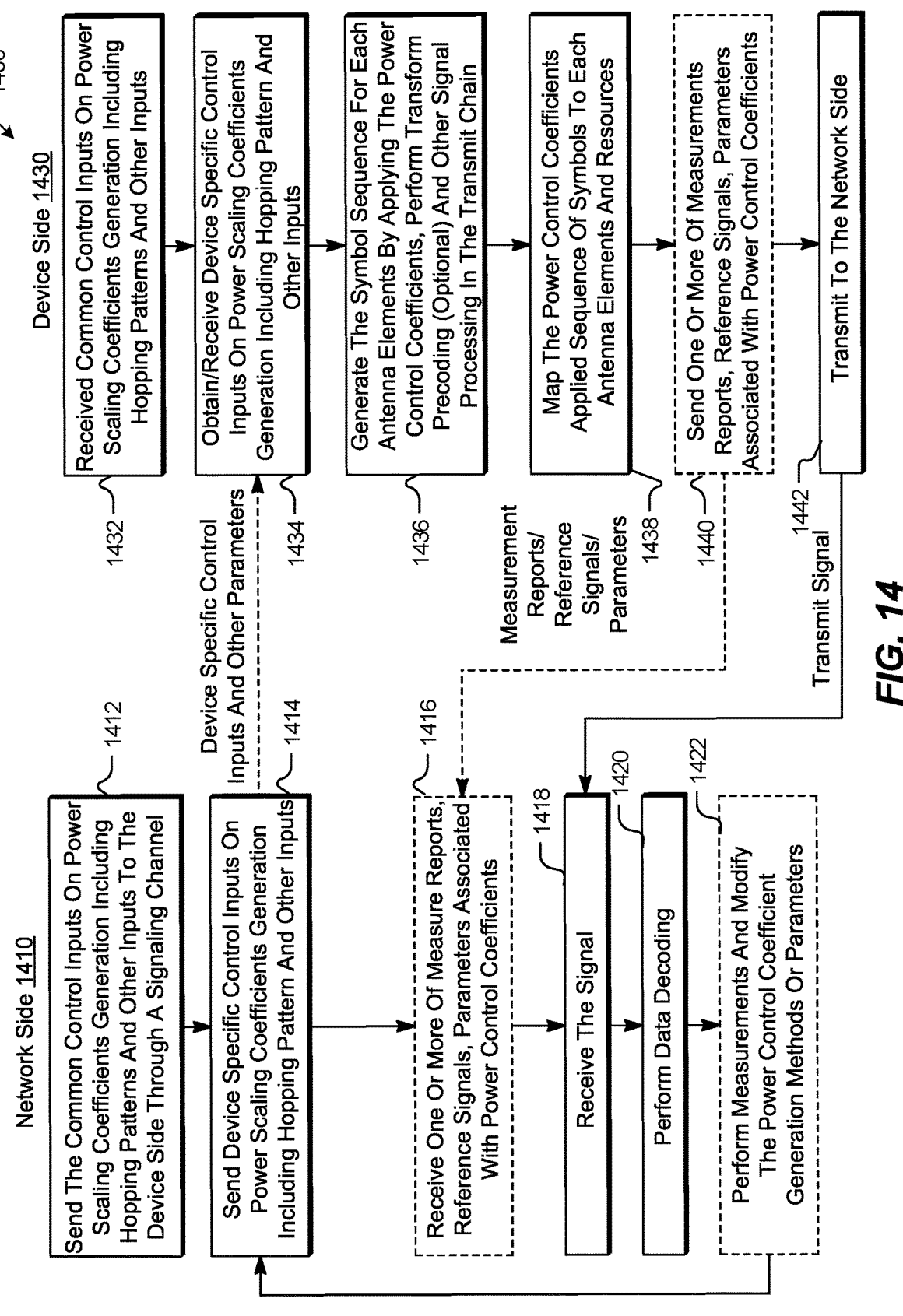
FIG. 14 illustrates an example information exchange and transmission for uplink transmission.

FIG. 14 illustrates an example information exchange and transmission 1400 for uplink transmission. At step 1412, the network side 1410 may send (or the device side 1430 may receive, at step 1432) the information regarding the common control inputs required to generate power scaling coefficients or amplitude scaling coefficients. This information may include one or more of the number of antennas to be used at the transmitter/device side, the basic power scaling coefficients (e.g., Table 1) or amplitude scaling coefficients, resource configuration and resource allocation information for the transmission, method for generating power scaling coefficients or amplitude scaling coefficients, the modulation and coding scheme, and group hopping value u to be used in the transmission. At step 1414, the network side 1410 may send device specific control inputs on power scaling coefficients or amplitude scaling coefficients generation including hopping pattern and other inputs. Correspondingly, the device side 1430 may also receive the information regarding the device specific control inputs required to generate power scaling coefficients or amplitude scaling coefficients. This information may include one or more indices to the particular power scaling coefficients (e.g., a particular index in Table 1) or amplitude scaling coefficients, a specific hopping pattern, device specific hopping value v, etc. The device specific and common control inputs may be received in one or more signaling channels such as RRC, DCI, MAC-CE, paging message or others. Some device specific and common control inputs may be received in one or more of a RRC state transition message (such as an RRC release message and an RRC release with suspend message) or another similar message. The device specific and common control input may be received at the device side 1430 in a single or multiple signaling messages at step 1434.

After receiving the control inputs, the device side 1430 may generate the signals for each antenna with appropriate power scaling coefficients or amplitude scaling coefficients at step 1436. At step 1438, the device side 1430 may map the power control coefficients or amplitude scaling coefficients applied sequence of symbols to each antenna elements and resources. In some scenario, the device side 1430 may perform some measurement, which may be reported to the network side 1410 at step 1440. In some scenario, the device side 1430 may transmit an uplink reference signal such as SRS, preamble or other signals to the network side 1410 at step 1440. In some scenario, the device side 1430 may report some parameters or configurations to the network side 1410 at step 1440. For the reporting purpose, the signaling channels such as RRC, UCI, MAC-CE or others may be used. For such scenario, the network side 1410 may receive one or more of measure reports, reference signals, parameters associated with power control coefficients or amplitude scaling coefficients at step 1416. The device side 1430 may transmit the symbols generated by the disclosed method at step 1442.

The network side 1410 may receive the signal transmitted by the device side at step 1418 and perform data decoding at step 1420. Optionally, the network side 1410 may perform some measurements and decide to modify the generation method or parameters of the power scaling coefficients or amplitude scaling coefficients at step 1422. Such modification may be signaled to the device side 1430. In other words, the device side 1430 may receive modification of the generation method or parameters of the power control coefficients or amplitude scaling coefficients from the network side 1410.

Figure 15A:
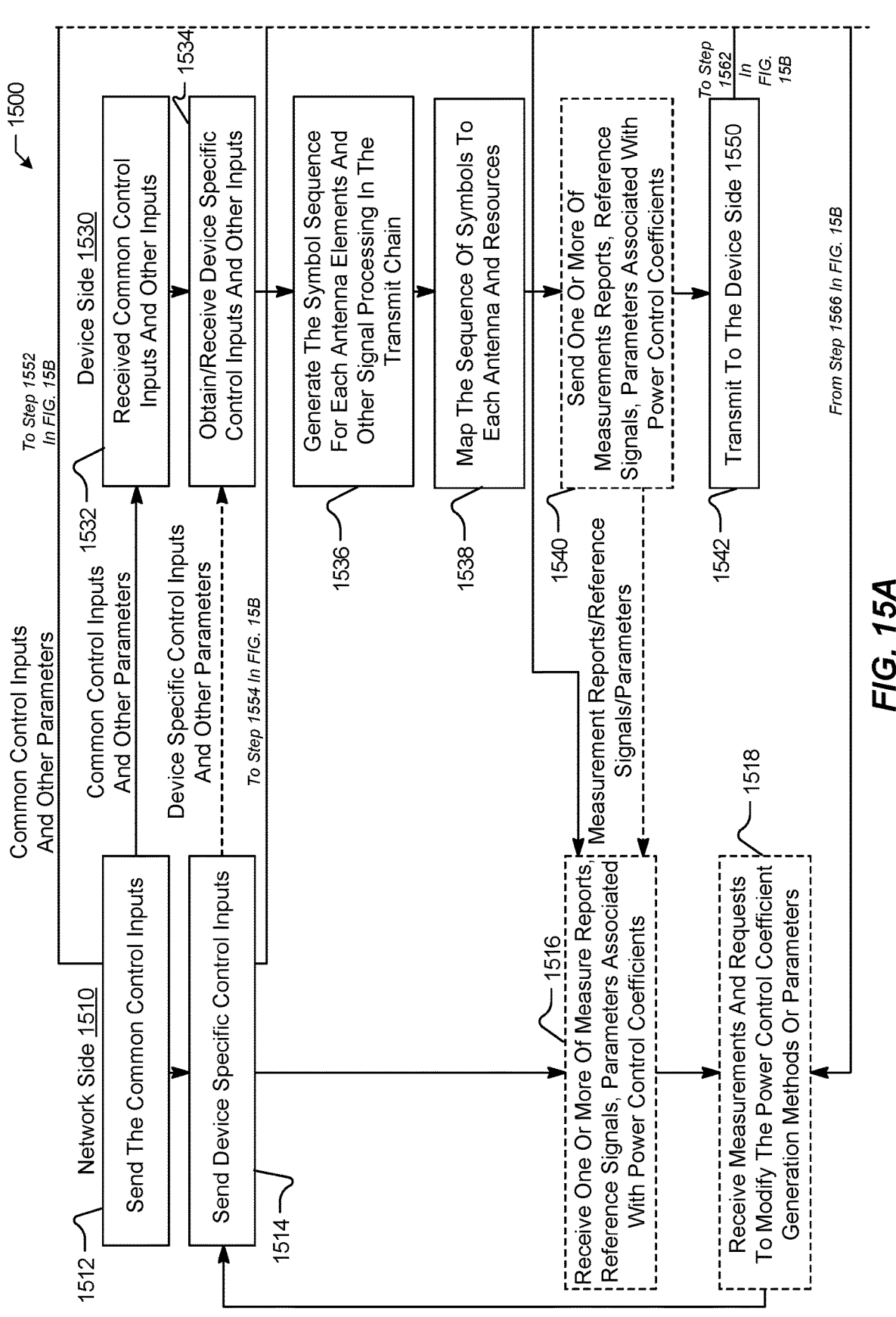
FIGS. 15A-15B illustrate an example information exchange and transmission for side link transmission.
Figure 15B:
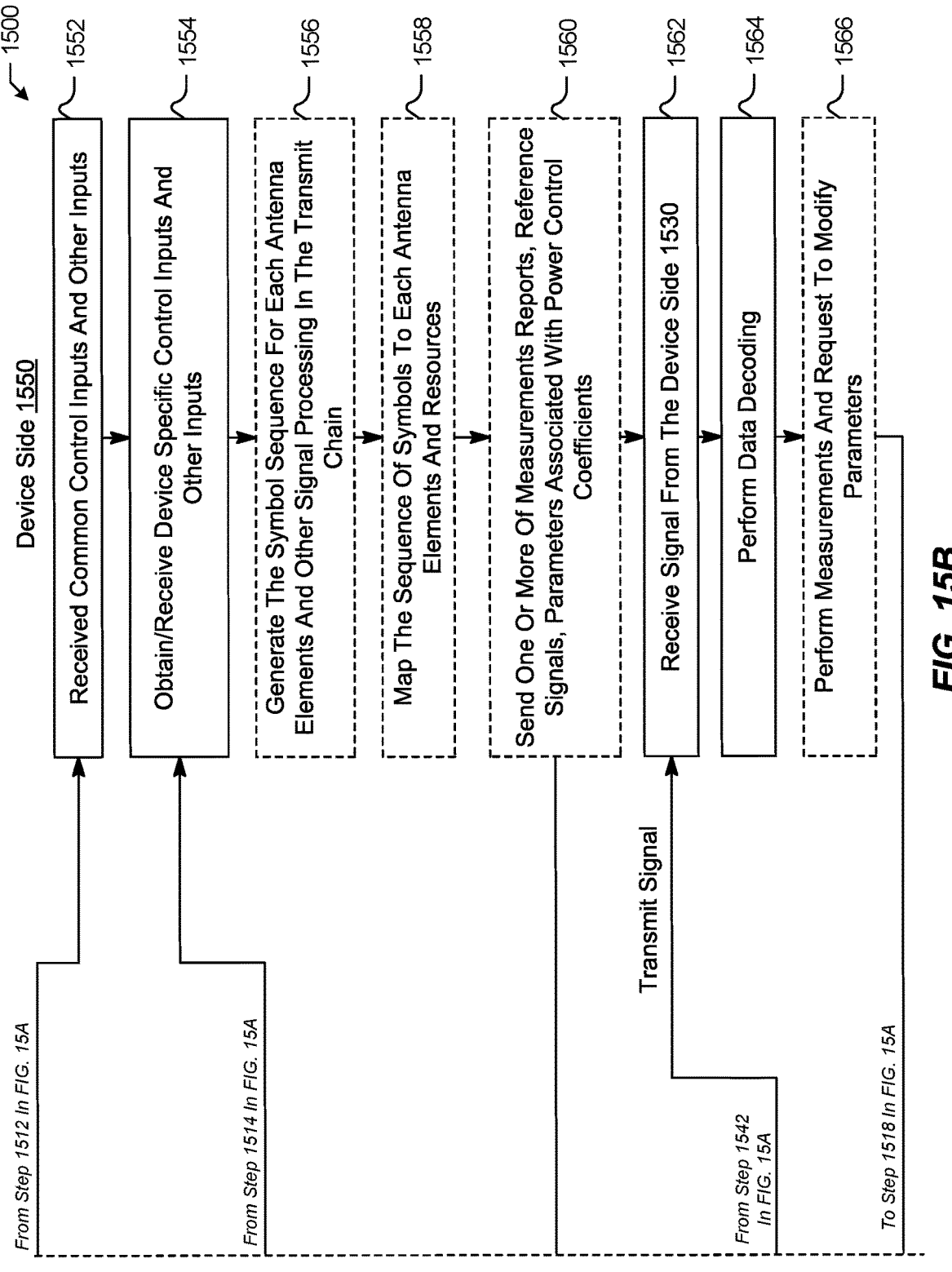

FIGS. 15A-15B illustrate an example information exchange and transmission 1500 for side link transmission. At step 1512, the network side 1510 may send to both devices (i.e., device side 1530 and device side 1550) information regarding the common control inputs required to generate power scaling coefficients. Correspondingly, device side 1530 and device side 1550 may both receive information regarding the common control inputs required to generate power scaling coefficients at step 1532 and step 1552, respectively. This information may include the number of antennas to be used at the transmitter/device side, the basic power control coefficients (e.g., Table 1) or amplitude scaling coefficients, resource configuration and resource allocation information for the transmission, generation of power scaling coefficients to be used in the transmission. At step 1514, the network side 1510 may send to device side 1530 and device side 1550 device specific control inputs. Correspondingly, the device side 1530 and device side 1550 may also receive the information regarding the device specific control inputs required to generate power scaling coefficients at step 1534 and step 1554, respectively. This information may include index to the particular power scaling coefficients (e.g., a particular index in Table 1) or amplitude scaling coefficients, a specific hopping pattern, etc. The device specific and common control inputs may be received in one or more signaling channel such as RRC, DCI, MAC-CE. Some device specific and common control inputs may be received in one or more of an RRC state transition messages (such as an RRC release message or an RRC release with suspend message) or another similar message. Some device specific and common control inputs may be received in one or more of paging messages. The device specific and common control input may be received at the device side in a single or multiple signaling messages.

After receiving the control inputs, device side 1530 and device side 1550 may generate the signals for each antenna with appropriate power scaling coefficients. At step 1536, device side 1530 may generate the symbol sequence for each antenna elements and other signal processing in the transmit chain. At step 1538, device side 1530 may map the sequence of symbols to each antenna and resources. Though not required, at step 1556, device side 1550 may optionally generate the symbol sequence for each antenna elements and other signal processing in the transmit chain. At step 1558, device side 1550 may optionally map the sequence of symbols to each antenna and resources. In some scenario, device side 1530 may perform some measurements, which may be reported to the network side 1510 at step 1540. In some scenario, device side 1550 may also perform some measurements (same or different from device side 1530), which may be reported to the network side 1510 at step 1560. In some scenario, device side 1530, device side 1550, or both may transmit an uplink reference signal such as SRS or other reference signal. In some scenario, device side 1530, device side 1550, or both may report some parameters or configurations to the network side 1510. For the reporting purpose, signaling channels such as RRC, UCI, MAC-CE or others may be used. As illustrated in FIG. 15A, the network side 1510 may receive one or more of measure reports, reference signals, parameters associated with power control coefficients at step 1516.

At step 1542, device side 1530 may transmit the symbols generated by the disclosed method to device side 1550. At step 1562, device side 1550 may receive the signal transmitted by device side 1530. At step 1564, device side 1550 may perform data decoding. Optionally, device side 1550 may perform some measurements and report to the network side 1510 or request to modify the generation method or parameters of the power scaling coefficient or amplitude scaling coefficients at step 1566. Such requests from device side 1550 may be received at the network side 1510 at step 1518. The network side 1510 may decide to modify the generation method or parameters of the power control coefficient based on the measurements of its own or those received from device side 1530, device side 1550, or both. Such decision may be signaled to device side 1530, device side 1550, or both. In other words, device side 1530, device side 1550, or both may receive modification of the generation method or parameters of the power scaling coefficient from the network side 1510.

Figure 16:
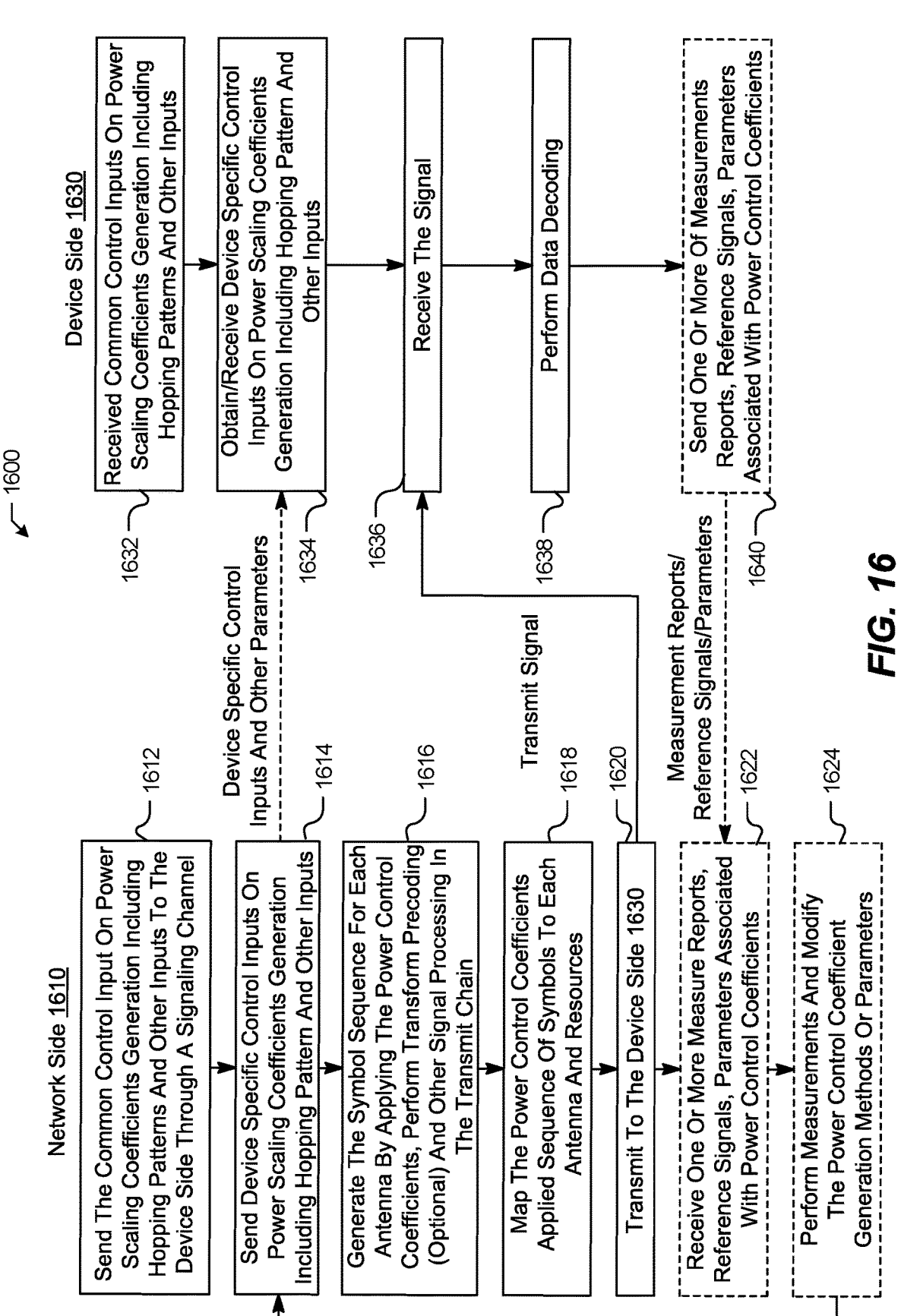
FIG. 16 illustrates an example information exchange for downlink transmission.

FIG. 16 illustrates an example information exchange 1600 for downlink transmission. At step 1612, the network side 1610 may send (or the device side 1630 may receive at step 1632) information regarding the common control inputs used by the network side 1610 to generate power scaling coefficients or amplitude scaling coefficients. This information may include the number of antennas to be used at the transmitter/device side, the basic power control coefficients (e.g., Table 1) or amplitude scaling coefficients, resource configuration and resource allocation information for the transmission, generation of power scaling coefficients or amplitude scaling coefficients to be used in the transmission. At step 1614, the network side 1610 may send device specific control inputs on power scaling coefficients or amplitude scaling coefficients generation including hopping pattern and other inputs. Correspondingly, at step 1634, the device side 1630 may also receive the information regarding the device specific control inputs used by the network side 1610 to generate power scaling coefficients. This information may include index to the particular power scaling coefficients (e.g., a particular index in Table 1), a specific hopping pattern, etc. The device specific and common control inputs may be received in one or more signaling channels such as RRC, DCI, and MAC-CE. Some device specific and common control inputs may be received in one or more of an RRC state transition message (such as an RRC release message or an RRC release with suspend message) or another similar message. Some device specific and common control inputs may be received in one or more of paging messages. The device specific and common control input may be received at the device side 1630 in a single or multiple signaling messages. One or more of these signaling parameters or configurations may be optional where such parameters and configurations may be estimated by the device side.

After the device side 1630 receives the control inputs, the network side 1610 may generate the signals for each antenna with appropriate power scaling coefficients. At step 1616, the network side 1610 may generate the symbol sequence for each antenna by applying the power control coefficients or amplitude scaling coefficients, perform transform precoding (optional) and other signal processing in the transmit chain. At step 1618, the network side 1610 may map the power control coefficients or amplitude scaling coefficients applied sequence of symbols to each antenna and resources. At step 1620, the network side 1610 may transmit the signal to the device side 1630. At step 1636, the device side 1630 may receive the signal. At step 1638, the device side 1630 may perform data decoding. In some scenario, the device side 1630 may perform some measurement, which may be reported to the network side 1610. In some scenario, the device side 1630 may transmit an uplink reference signal such as SRS or other signal to the network side 1610. In some scenario, the device side 1630 may report some parameters or configurations to the network side 1610. For the reporting purpose, signaling channels such as RRC, UCI, MAC-CE or others may be used. As illustrated in FIG. 16, the device side 1630 may send one or more of measurements reports, reference signals, parameters associated with power control coefficients at step 1640.

At step 1622, the network side 1610 may receive one or more measure reports, reference signals, parameters associated with power control coefficients from the device side and perform data decoding. Optionally, the network side 1610 may perform some measurements and decide to modify the generation method or parameters of the power scaling coefficient at step 1624. Such modification may be signaled to the device side 1630. In other words, the device side 1630 may receive modification of the generation method or parameters of the power control coefficient from the network side 1610.

In order to validate the embodiments disclosed herein, computer simulation results are provided below. In the simulation, there are two devices with two antennas in each device transmitting to a single antenna BS. Each device transmits independent block of data of size 1200 bits with QPSK modulation. The channel is generated as complex Gaussian random (static fading) and remains unchanged for the entire transmission of the packet of size 1200 bits. Two channels of the two devices are correlated. The amount of correlation between the two device channels are modeled by the correlation parameter ρ. Monte-Carlo simulation is performed for 10000 trials.

Figure 17:
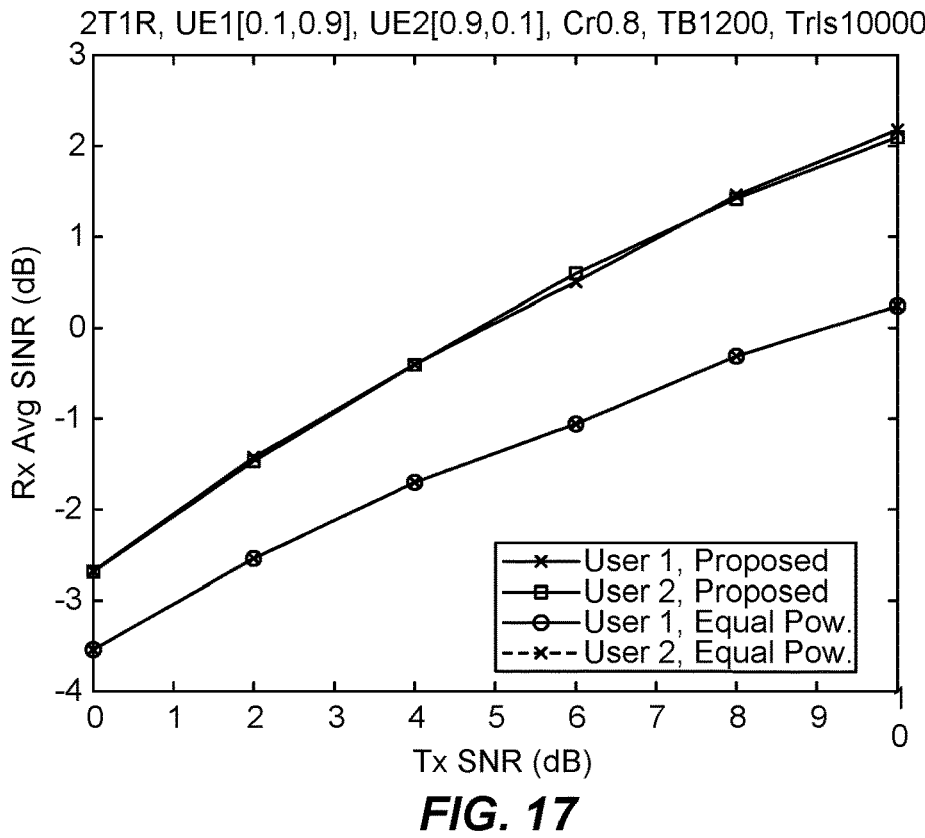
FIG. 17 illustrates an example average receive SINR over the transmit SNR for a high correlation scenario.

FIG. 17 illustrates an example average receive SINR over the transmit SNR for a high correlation scenario. The high correlation may be reflected by ρ=0.8. This is an example scenario of high similarity of the channels. One device applies the basic power scaling coefficients [0.1,0.9] (index 1 in Table 1) while the other device applies the basic power scaling coefficients [0.9,0.1] (index 2 in Table 1). Equal power at transmit antennas are used as the baseline. As shown in the FIG. 17, for a given SNR, significantly higher receive SINR may be achieved (more than 1.3 dB higher receive SINR at 4 dB SNR). These higher SINR may translate into higher rates and higher system throughput.

Figure 18:
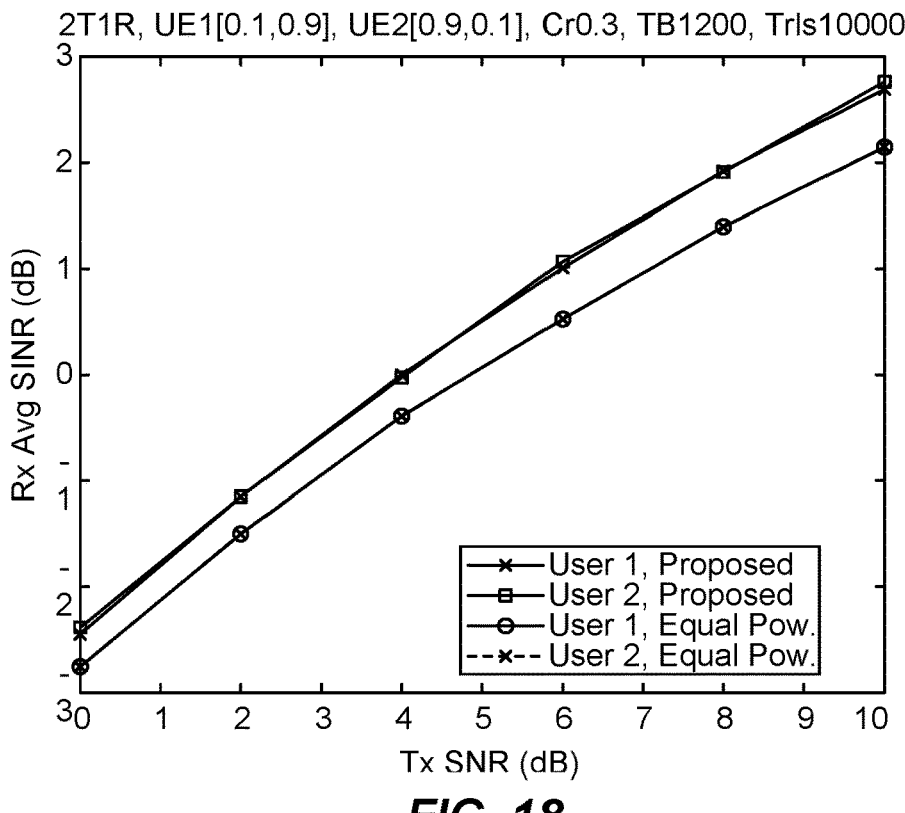
FIG. 18 illustrates an example receive SINR over the SNR for low correlation scenario.

For the similar set up (basic power scaling coefficients [0.1,0.9] and [0.9,0.1] applied by the two devices), FIG. 18 illustrates an example receive SINR over the SNR for low correlation scenario. The low correlation scenario may be reflected by ρ=0.3. As shown in FIG. 18, for a given SNR, noticeable higher receive SINR may be achieved. These higher SINR may translate into higher rates and higher system throughput even if the channel similarity is small.

Figure 19:
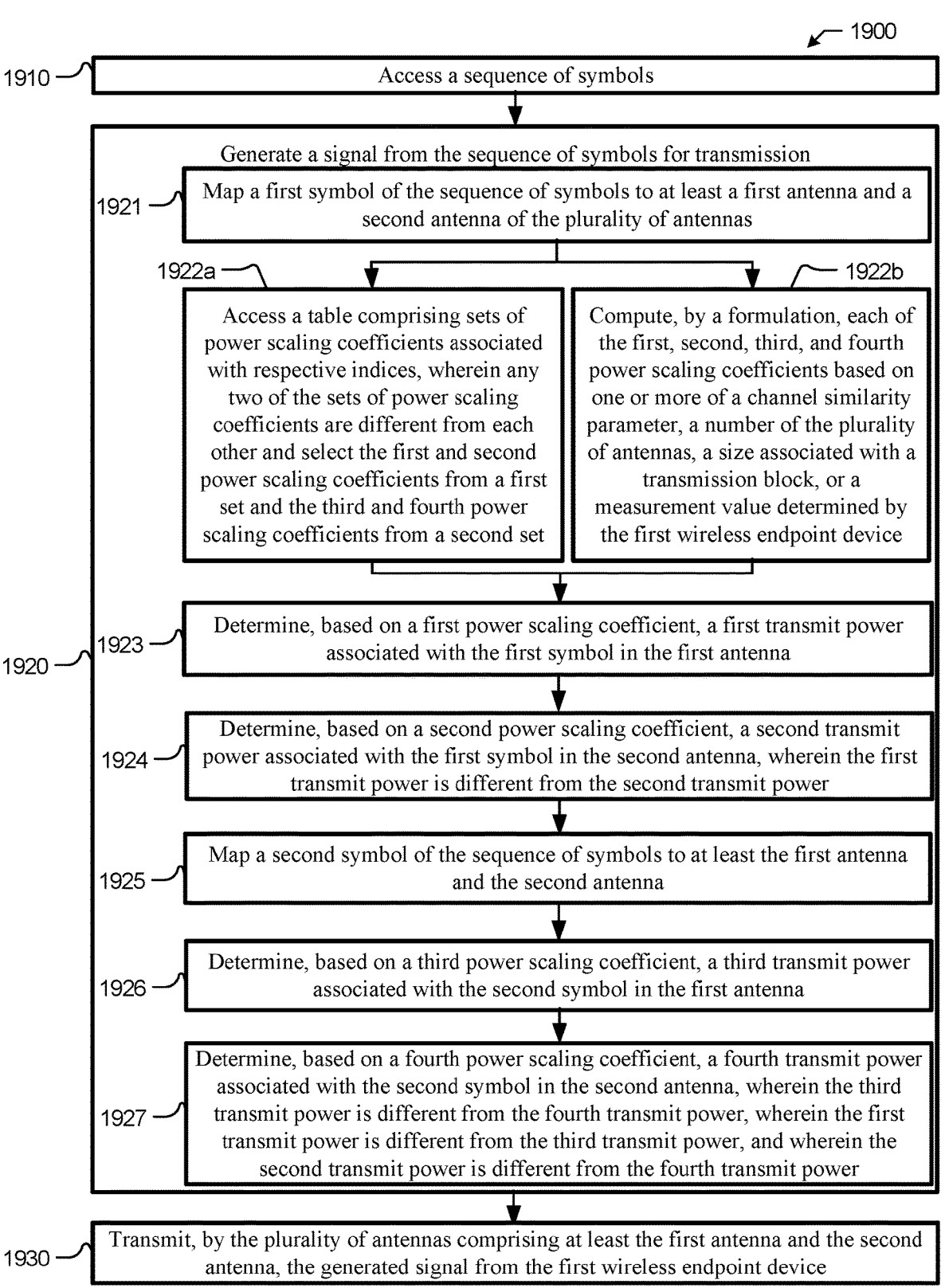
FIG. 19 illustrates is a flow diagram of a method for enabling multiple access based on controlling transmit power of multiple transmit antennas, in accordance with the presently disclosed embodiments.

FIG. 19 illustrates is a flow diagram of a method 1900 for enabling multiple access based on controlling transmit power of multiple transmit antennas, in accordance with the presently disclosed embodiments. The method 1900 may be performed utilizing one or more processing devices (e.g., a first wireless endpoint device) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 1900 may begin at step 1910 with the one or more processing devices (e.g., the first wireless endpoint device). For example, in particular embodiments, the first wireless endpoint device may access a sequence of symbols. The method 1900 may then continue at step 1920 with the one or more processing devices (e.g., the first wireless endpoint device). For example, in particular embodiments, the first wireless endpoint device may generate a signal from the sequence of symbols for transmission. Step 1920 may comprise the following sub-steps with the one or more processing devices (e.g., the first wireless endpoint device). For example, in particular embodiments, the first wireless endpoint device may map a first symbol of the sequence of symbols to at least a first antenna and a second antenna of the plurality of antennas at sub-step 1921. The method 1900 may then continue at sub-step 1922a or at sub-step 1922b, which describe alternative embodiments. For example, in particular embodiments, the first wireless endpoint device may access a table comprising sets of power scaling coefficients associated with respective indices, wherein any two of the sets of power scaling coefficients are different from each other and select the first and second power scaling coefficients from a first set and the third and fourth power scaling coefficients from a second set at sub-step 1922a. In alternative embodiments, the first wireless endpoint device may compute, by a formulation, each of the first, second, third, and fourth power scaling coefficients based on one or more of a channel similarity parameter, a number of the plurality of antennas, a size associated with a transmission block, or a measurement value determined by the first wireless endpoint device at sub-step 1922*b*. Alternatively, amplitude of the sequence of symbols may be adjusted to achieve a similar effect of power scaling coefficients. The method 1900 may then continue at sub-step 1923 with the one or more processing devices (e.g., the first wireless endpoint device). For example, in particular embodiments, the first wireless endpoint device may determine, based on a first power scaling coefficient, a first transmit power associated with the first symbol in the first antenna. The method 1900 may then continue at sub-step 1924 with the one or more processing devices (e.g., the first wireless endpoint device). For example, in particular embodiments, the first wireless endpoint device may determine, based on a second power scaling coefficient, a second transmit power associated with the first symbol in the second antenna, wherein the first transmit power is different from the second transmit power. The method 1900 may then continue at sub-step 1925 with the one or more processing devices (e.g., the first wireless endpoint device). For example, in particular embodiments, the first wireless endpoint device may map a second symbol of the sequence of symbols to at least the first antenna and the second antenna. The method 1900 may then continue at sub-step 1926 with the one or more processing devices (e.g., the first wireless endpoint device). For example, in particular embodiments, the first wireless endpoint device may determine, based on a third power scaling coefficient, a third transmit power associated with the second symbol in the first antenna. The method 1900 may then continue at sub-step 1927 with the one or more processing devices (e.g., the first wireless endpoint device). For example, in particular embodiments, the first wireless endpoint device may determine, based on a fourth power scaling coefficient, a fourth transmit power associated with the second symbol in the second antenna, wherein the third transmit power is different from the fourth transmit power, wherein the first transmit power is different from the third transmit power, and wherein the second transmit power is different from the fourth transmit power. The method 1900 may then continue at step 1930 with the one or more processing devices (e.g., the first wireless endpoint device). For example, in particular embodiments, the first wireless endpoint device may transmit, by the plurality of antennas comprising at least the first antenna and the second antenna, the generated signal from the first wireless endpoint device. Particular embodiments may repeat one or more steps of the method of FIG. 19, where appropriate. Although this disclosure describes and illustrates particular steps of the method of FIG. 19 as occurring in a particular order, this disclosure contemplates any suitable steps of the method of FIG. 19 occurring in any suitable order. Moreover, although this disclosure describes and illustrates an example method for enabling multiple access based on controlling transmit power of multiple transmit antennas including the particular steps of the method of FIG. 19, this disclosure contemplates any suitable method for enabling multiple access based on controlling transmit power of multiple transmit antennas including any suitable steps, which may include all, some, or none of the steps of the method of FIG. 19, where appropriate. Furthermore, although this disclosure describes and illustrates particular components, devices, or systems carrying out particular steps of the method of FIG. 19, this disclosure contemplates any suitable combination of any suitable components, devices, or systems carrying out any suitable steps of the method of FIG. 19.

Systems and Methods

Figure 20:
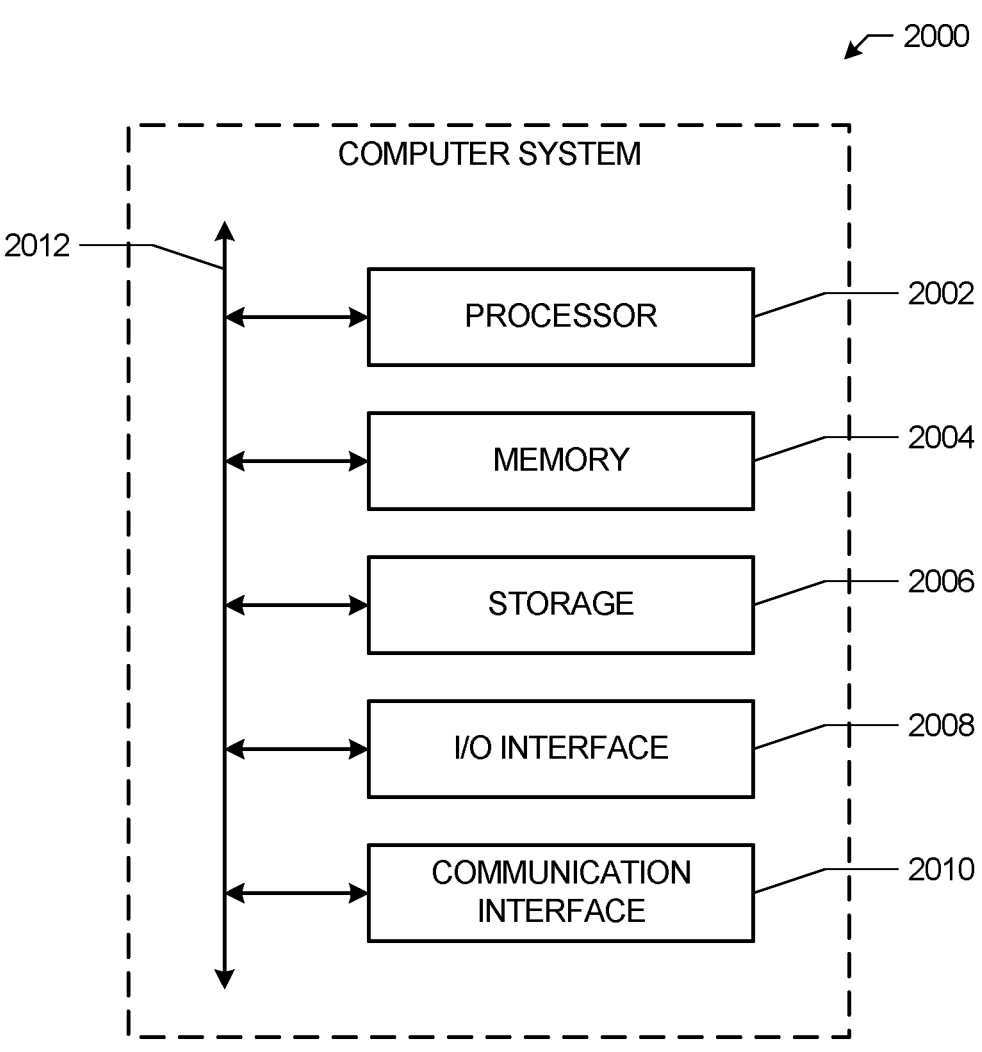
FIG. 20 illustrates an example computer system that may be utilized to perform automated control of smart appliances, in accordance with the presently disclosed embodiments.

FIG. 20 illustrates an example computer system 2000 that may be utilized to perform automated control of smart appliances, in accordance with the presently disclosed embodiments. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a personal wearable device/system, a IoT device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks.

Where appropriate, one or more computer systems 2000 may perform without substantial spatial or temporal limitation one or more steps of one or more methods described or illustrated herein. As an example, and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement. In particular embodiments, processor 2002 includes hardware for executing instructions, such as those making up a computer program. As an example, and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example, and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002.

Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example, and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere).

One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memory devices, where appropriate. Although this disclosure describes and illustrates particular memory, this disclosure contemplates any suitable memory.

In particular embodiments, storage 2006 includes mass storage for data or instructions. As an example, and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example, and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it.

As an example, and not by way of limitation, computer system 2000 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example, and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first wireless endpoint device comprising a plurality of antennas:
   accessing a sequence of symbols;
   generating a signal from the sequence of symbols for transmission, wherein the generation comprises:
      mapping a first symbol of the sequence of symbols to at least a first antenna and a second antenna of the plurality of antennas;
      determining, based on a first power scaling coefficient, a first transmit power associated with the first symbol in the first antenna;
      determining, based on a second power scaling coefficient, a second transmit power associated with the first symbol in the second antenna, wherein the first transmit power is different from the second transmit power;
      mapping a second symbol of the sequence of symbols to at least the first antenna and the second antenna;
      determining, based on a third power scaling coefficient, a third transmit power associated with the second symbol in the first antenna; and
      determining, based on a fourth power scaling coefficient, a fourth transmit power associated with the second symbol in the second antenna, wherein the third transmit power is different from the fourth transmit power, wherein the first transmit power is different from the third transmit power, and wherein the second transmit power is different from the fourth transmit power; and
   transmitting, by the plurality of antennas comprising at least the first antenna and the second antenna, the generated signal from the first wireless endpoint device.

2. The method of claim 1, further comprising:
   accessing a table comprising a plurality of sets of power scaling coefficients associated with a plurality of indices, respectively, wherein any two of the sets of power scaling coefficients are different from each other; and
   selecting the first and second power scaling coefficients from a first set of power scaling coefficients and the third and fourth power scaling coefficients from a second set of power scaling coefficients.

3. The method of claim 2, wherein the first set of power scaling coefficients and the second set of power scaling coefficients correspond to a same index.

4. The method of claim 1, further comprising:

computing, by a formulation, each of the first, second, third, and fourth power scaling coefficients based on one or more of a channel similarity parameter, a number of the plurality of antennas, a size associated with a transmission block, or a measurement value determined by the first wireless endpoint device.

5. The method of claim 4, wherein computing each of the first, second, third, and fourth power scaling coefficients by the formulation is further based on one or more of a group hopping value or a device specific hopping value.

6. The method of claim 1, further comprising:

generating the signal from the sequence of symbols further comprises modifying amplitude and phase of the sequence of symbols based on one or more of spreading sequencing or scrambling sequencing.

7. The method of claim 6, wherein modifying amplitude and phase of the sequence of symbols is further based on one or more of a group hopping value or a device specific hopping value.

8. The method of claim 1, further comprising:

mapping the first and second power scaling coefficients or the third and fourth power scaling coefficients to a resource grid for orthogonal frequency division multiplexing (OFDM), wherein the resource grid is based on time and frequency.

9. The method of claim 1, further comprising:

determining a transmit power of the generated signal based on a power-control algorithm based on one or more of a maximum allowed transmit power, a target received power, an estimate of a path loss, a fractional path-loss compensation, a subcarrier spacing, a number of resource blocks assigned for transmission, a modulation scheme, a channel-coding rate for transmission, a power adjustment for a closed-loop power control.

10. The method of claim 9, wherein transmitting the requested inputs comprises signaling the requested inputs via a signaling channel determined based on one or more propagation channel parameters.

11. The method of claim 1, further comprising:

receiving, from a second wireless endpoint device, a request for one or more inputs for generations of power scaling coefficients, wherein the one or more inputs comprise one or more of a number of the plurality of antennas, a basic power control coefficient, a resource configuration, a resource allocation, a modulation scheme, a coding scheme, a hopping pattern, a device specific hopping value, or a group hopping value; and transmitting, to the second wireless endpoint device, the requested inputs.

12. The method of claim 1, further comprising:

generating a plurality of coded bits from a plurality of information bits based on forward error correction;

applying bit-level processing to the plurality of coded bits; and generating the sequence of symbols from the plurality of coded bits based on a modulation.

13. An electronic device comprising:

a first wireless endpoint device comprising a plurality of antennas;

one or more non-transitory computer-readable storage media including instructions; and one or more processors coupled to the storage media, the one or more processors configured to execute the instructions to:

access a sequence of symbols;

generate a signal from the sequence of symbols for transmission, wherein the generation comprises:

mapping a first symbol of the sequence of symbols to at least a first antenna and a second antenna of the plurality of antennas;

determining, based on a first power scaling coefficient, a first transmit power associated with the first symbol in the first antenna;

determining, based on a second power scaling coefficient, a second transmit power associated with the first symbol in the second antenna, wherein the first transmit power is different from the second transmit power;

mapping a second symbol of the sequence of symbols to at least the first antenna and the second antenna;

determining, based on a third power scaling coefficient, a third transmit power associated with the second symbol in the first antenna; and determining, based on a fourth power scaling coefficient, a fourth transmit power associated with the second symbol in the second antenna, wherein the third transmit power is different from the fourth transmit power, wherein the first transmit power is different from the third transmit power, and wherein the second transmit power is different from the fourth transmit power; and transmit, by the plurality of antennas comprising at least the first antenna and the second antenna, the generated signal from the first wireless endpoint device.

* * * * *